United States Patent

Ookawa et al.

[11] Patent Number: 5,796,226
[45] Date of Patent: Aug. 18, 1998

[54] ENERGIZATION CONTROL SYSTEM FOR SWITCHED RELUCTANCE MOTOR

[75] Inventors: Akemi Ookawa, Chita-gun; Chiaki Umemura, Toyohashi, both of Japan

[73] Assignee: Aisin Seiki Kabushiki Kaisha, Kariya, Japan

[21] Appl. No.: 714,995

[22] Filed: Sep. 17, 1996

[30] Foreign Application Priority Data

Sep. 29, 1995 [JP] Japan ................................ 7-253240

[51] Int. Cl.$^6$ ............................................. H02P 7/00
[52] U.S. Cl. ................................... 318/254; 318/439
[58] Field of Search ................................ 318/254, 439, 318/138, 609, 610

[56] References Cited

U.S. PATENT DOCUMENTS

| | | | |
|---|---|---|---|
| 4,987,546 | 1/1991 | Blohm et al. | 364/474.3 |
| 5,023,527 | 6/1991 | Erdman et al. | 318/254 |
| 5,023,528 | 6/1991 | Saidin et al. | 318/254 |
| 5,113,125 | 5/1992 | Stacey | 318/721 |
| 5,124,625 | 6/1992 | Wakabayashi | 318/603 |

FOREIGN PATENT DOCUMENTS 1-298940  12/1989  Japan.

*Primary Examiner*—Jonathan Wysocki
*Attorney, Agent, or Firm*—Burns, Doane, Swecker & Mathis, LLP

[57] ABSTRACT

A system which energizes an SR motor with a three phase sequential and time sharing energization. Coil of respective phase is energized in an interval from an energization ON angle to an energization OFF angle. The OFF angle is advanced in reverse proportion to a speed and a target torque of a rotor of the motor in a high speed range exceeding a threshold Rbase which is an upper limit of a speed range in which a high noises is generated by a tangential oscillation of the rotor. The OFF angle is advanced in proportion to the speed of the rotor and in reverse proportion to the target torque in a low speed range under the threshold Rbase. The advance prevents the generation of noises. The system includes a compensator which corrects an energization level for accommodating an actual acceleration to a target acceleration of the rotor.

8 Claims, 36 Drawing Sheets

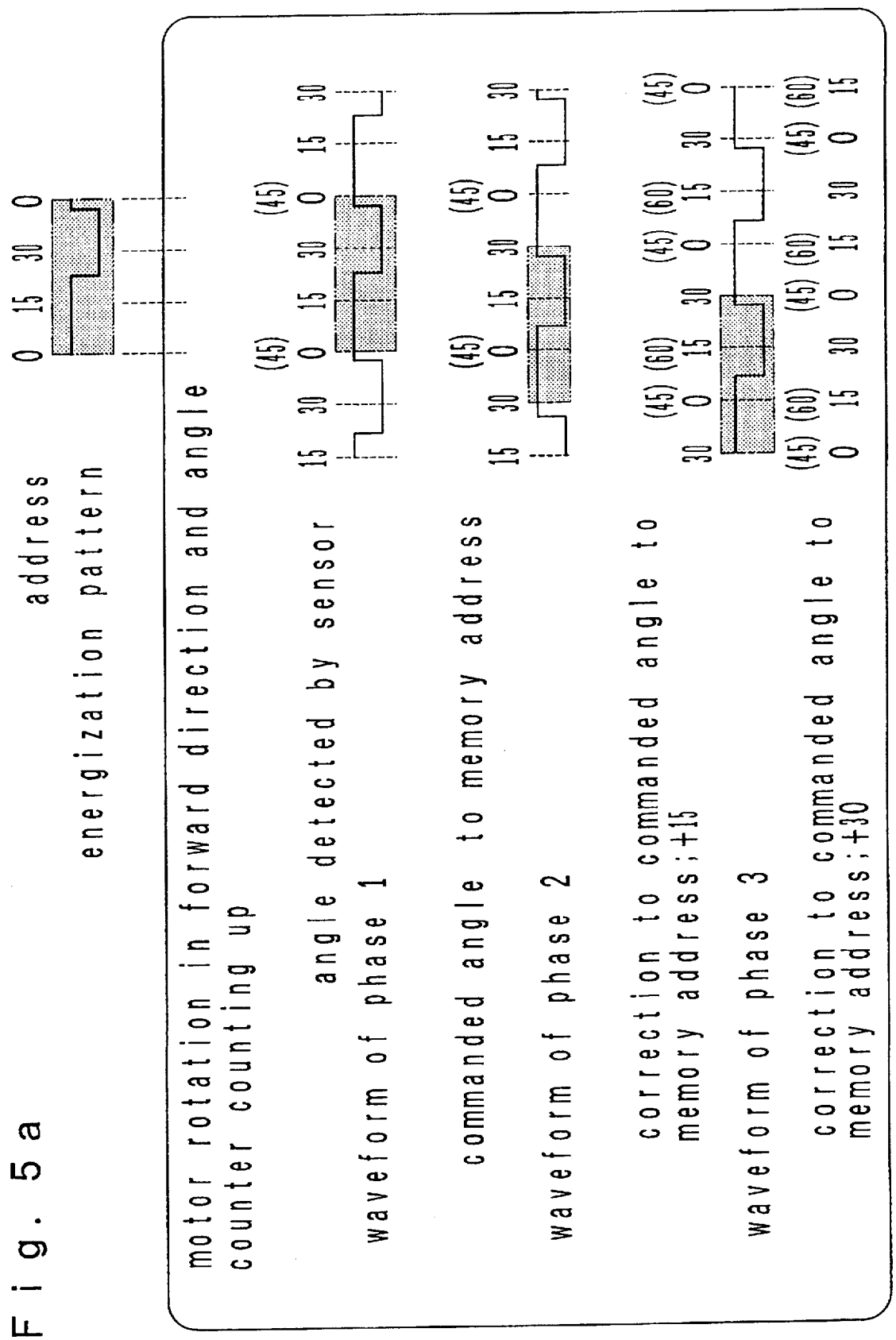

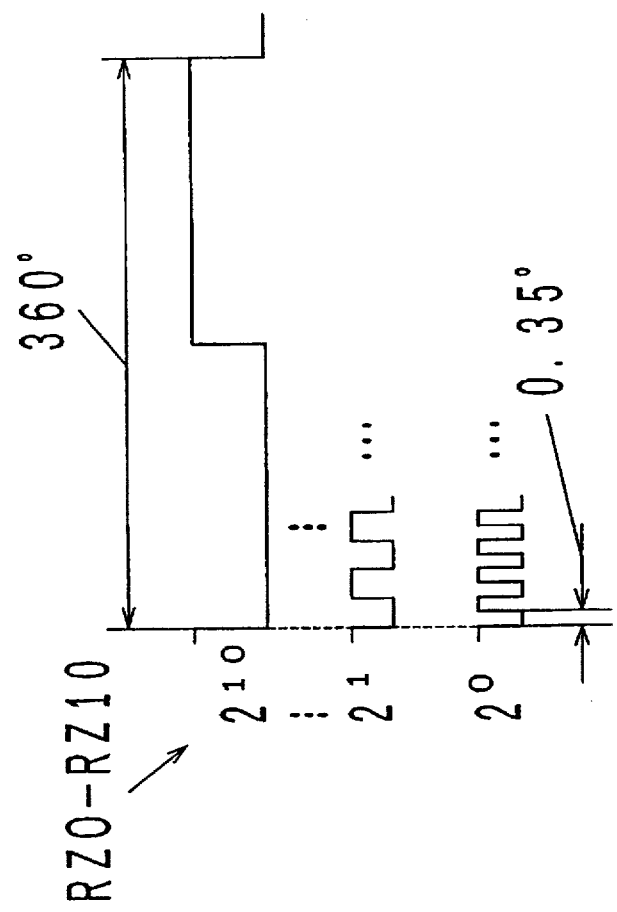

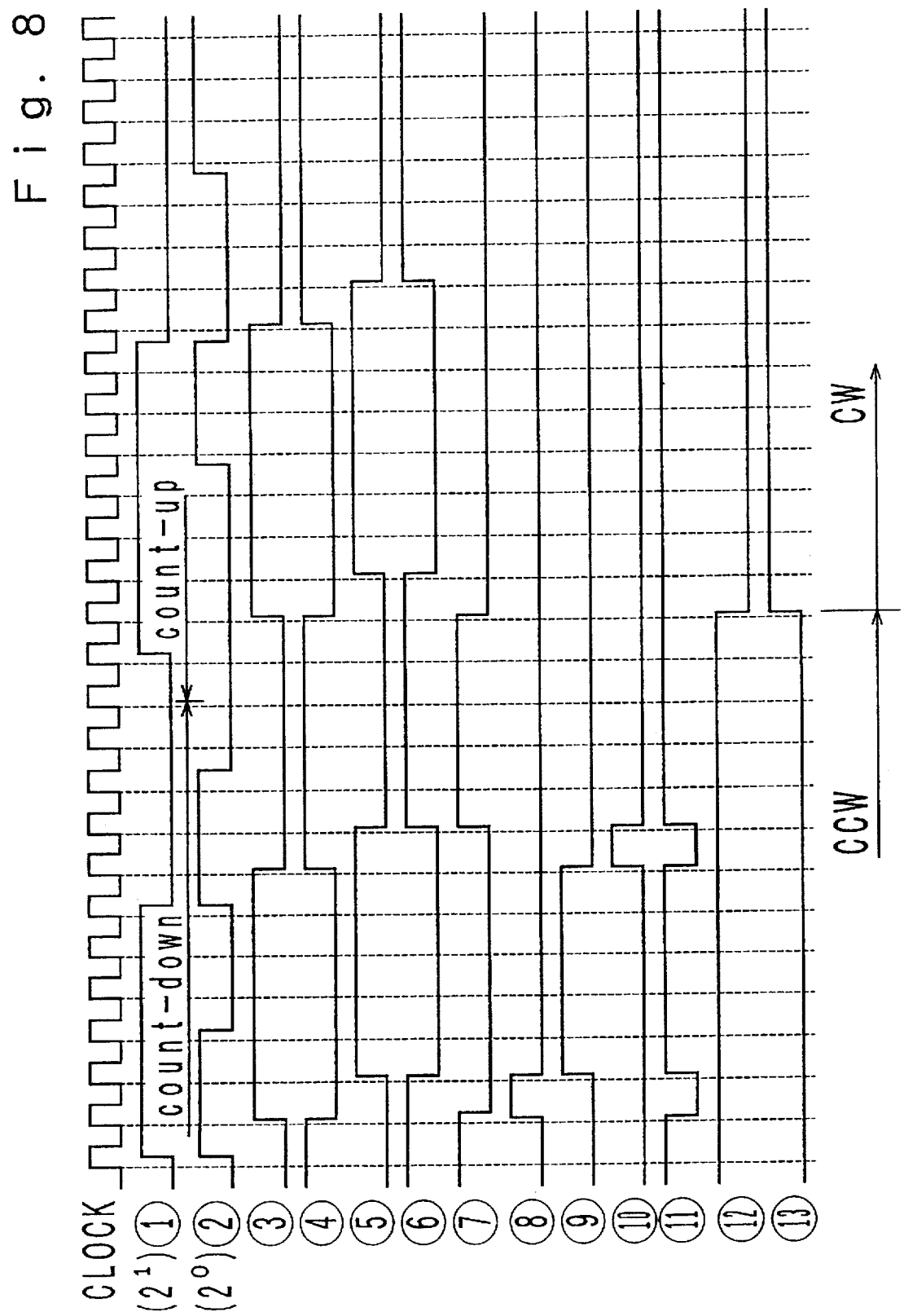

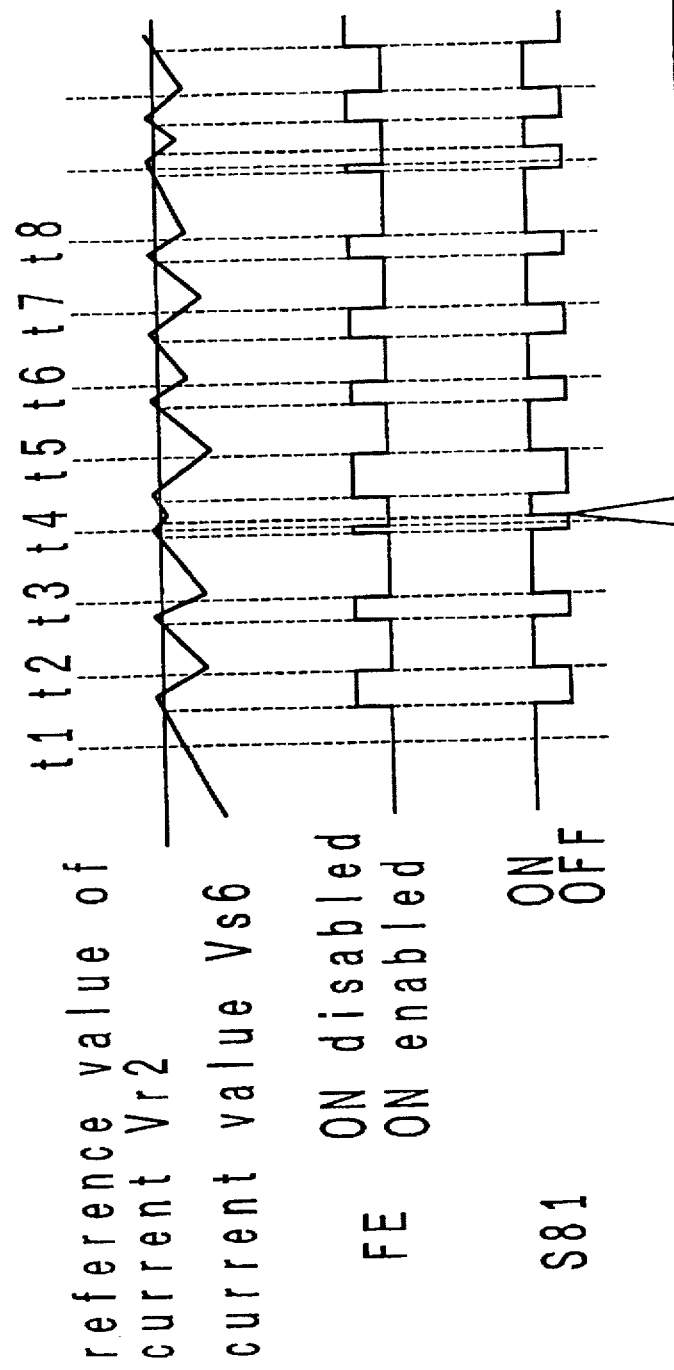

example ; P34

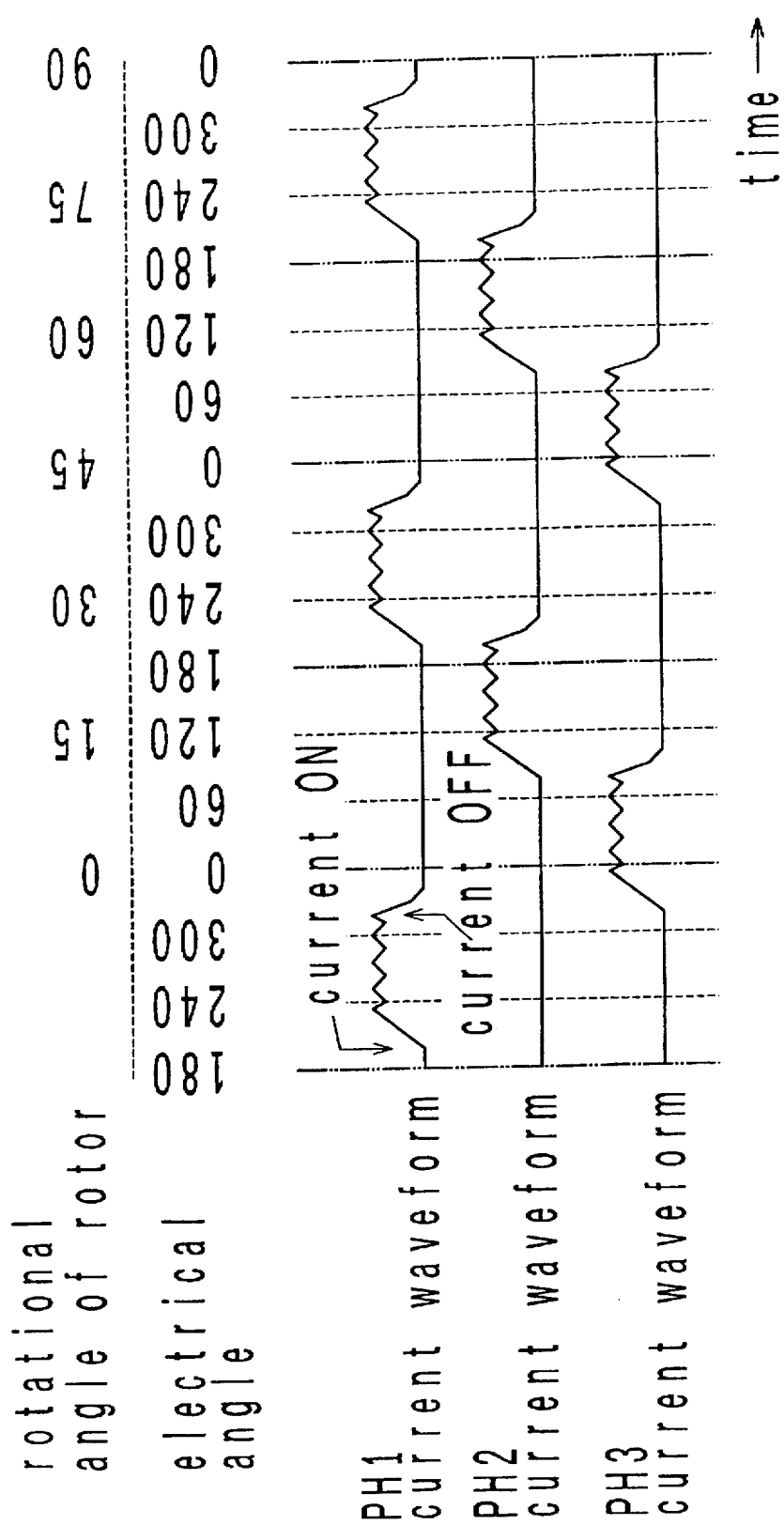

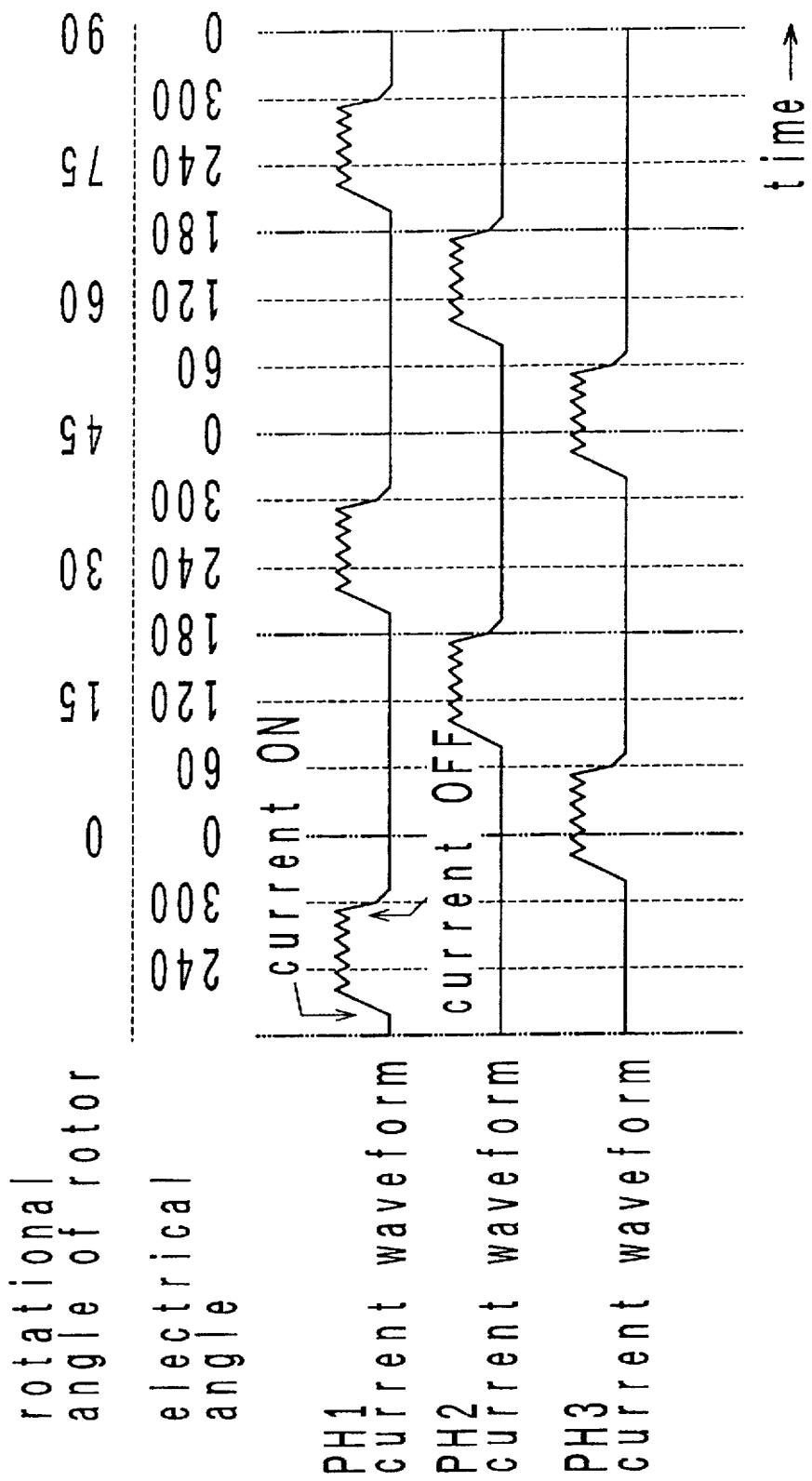

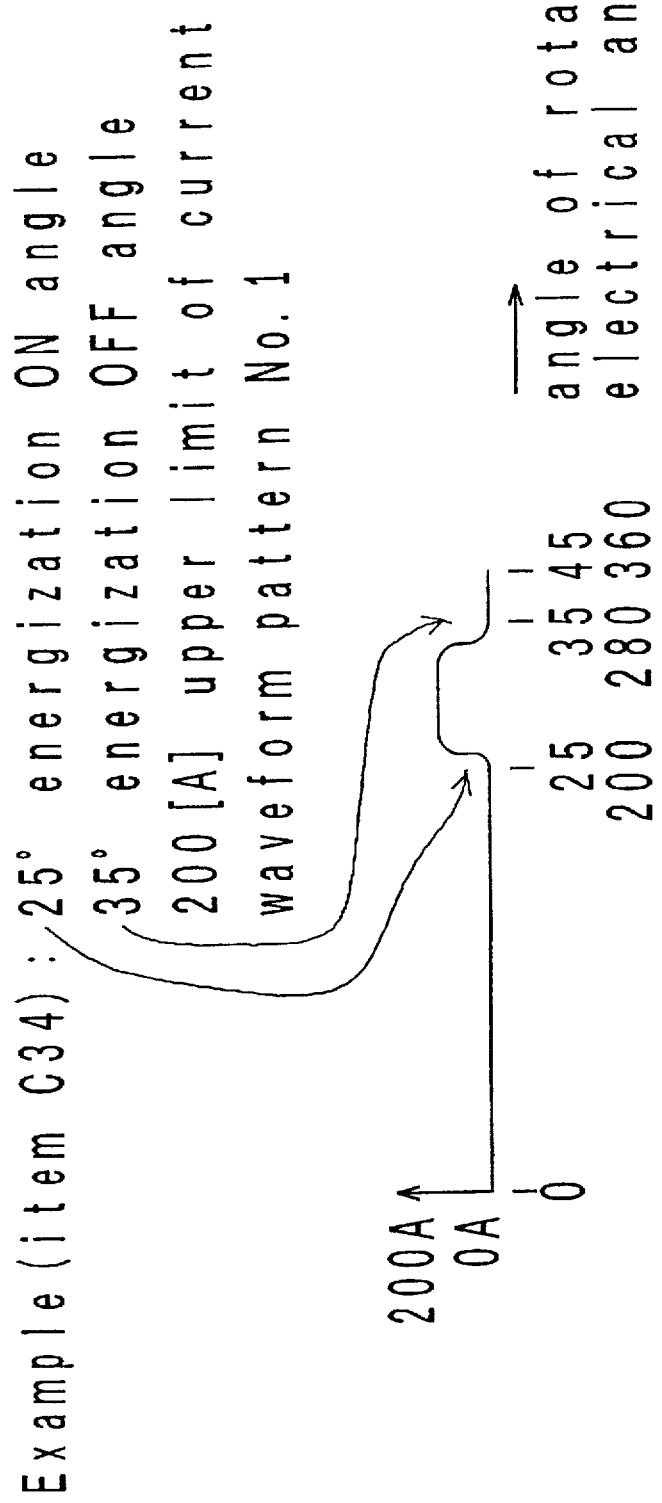

A change is rapid enough to track a rapid change in the reference. Off-current flows as indicated in Fig. 23b, producing a large potential difference and causing a rapid decay of current.

Magnitude of variation is high to cause an increased level of acoustic noise as a result of oscillation of motor.

A change occurs slowly, and cannot track a change in the reference if the rate of latter change is too fast. Off-current flows as indicated in Fig. 24b, producing a reduced potential difference and causing a slow decay of current.

Magnitude of variation is reduced, resulting in a reduced level of motor noises.

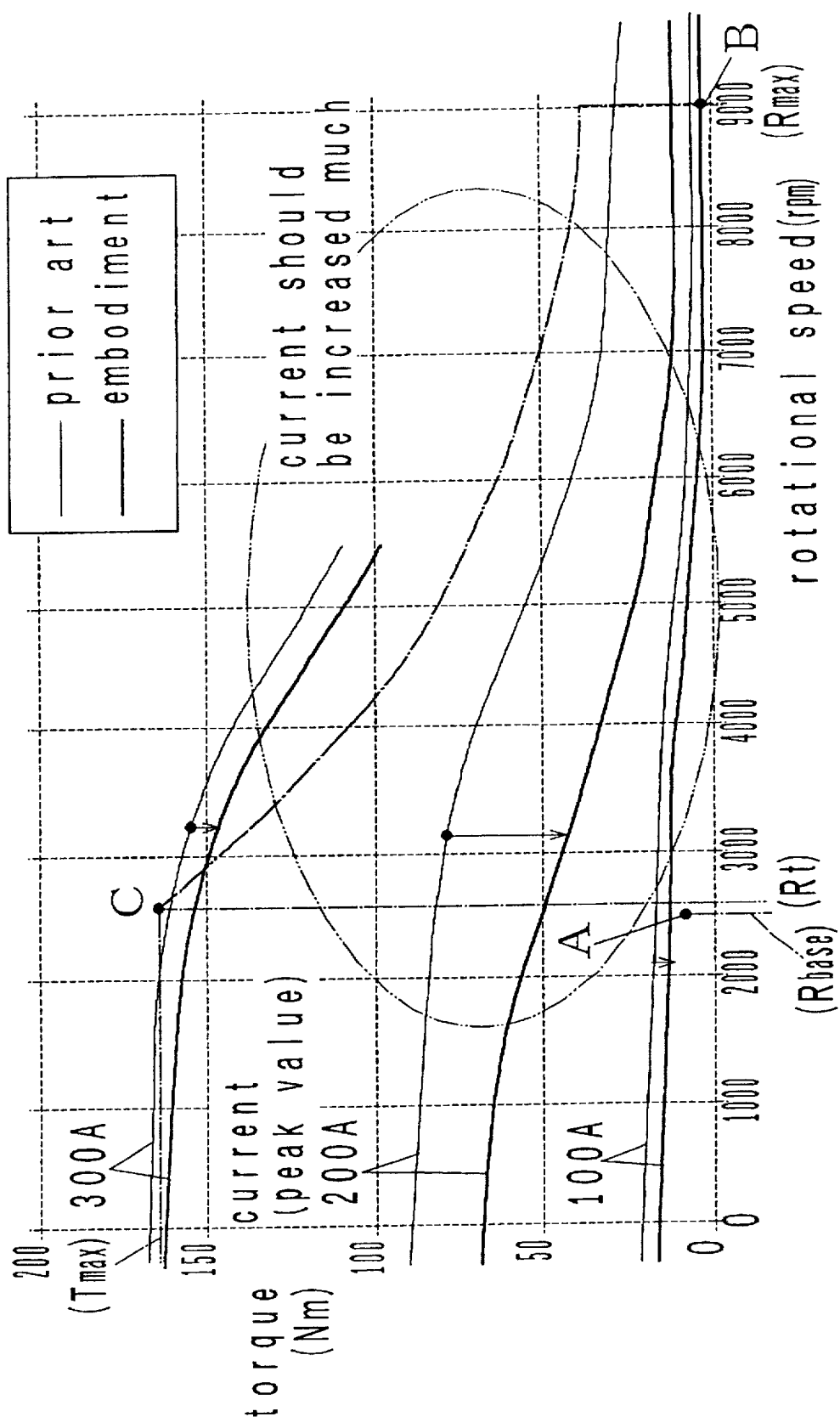

ENERGIZATION CONTROL SYSTEM FOR SWITCHED RELUCTANCE MOTOR

CROSS-REFERENCES TO RELATED PATENT APPLICATIONS (1) Application Ser. No. 08/411,974 filed Mar. 28, 1995 now U.S. Pat. No. 5,532,567 issued Jul. 2, 1996 and entitled "Controller for Switched Reluctance Motor", the inventors being Shinichiro Iwasaki et al. This application discloses suppression of a peak noise level as may be caused by a resonance when an SR motor is driven. An offset is intentionally provided between a position for a maximum drive efficiency where the energization is actually switched. Such offsets are generated in terms of random numbers, producing a fluctuation in the frequency of the oscillations which result. The fluctuation in the frequency is effective to prevent the occurrence of a resonance. In order to avoid a resulting reduction in the drive efficiency, the magnitude of such offsets are limited to lie within a permissible shift angle, which is in turn determined in terms of the prevailing torque and number of revolutions, by reference to a map.

(2) application Ser. No. 08/428,367 filed Apr. 25, 1995 and entitled "Controller for Switched Reluctance Motor", the inventors being Shinichiro Iwasaki et al. This application discloses a controller for suppressing oscillations and acoustic noises of a SR motor, which result from a rapid change in the magnetic flux upon switching the energization of coils of the motor. The controller switches current waveform as the current rises or falls to minimize a change in the magnetic flux, thus suppressing a reduction in the driving torque. A time interval required for the current to rise or fall is chosen to be greater than one-half the period of the natural frequency of the SR motor.

(3) application Ser. No. 08/572,287 filed Dec. 13, 1995 and entitled "Energization Control System for Electric Motor", the inventors being Masanori Sugiyama et al. This application discloses a system which energizes an SR motor with a current of a level which corresponds to a target rotational speed and a target torque of a rotor. The system also includes a direction of rotation detector circuit which detects an oscillation of the rotor in a peripheral direction and a compensator which corrects an energization level in synchronism with the oscillation, thereby suppressing an oscillation of the rotor in the peripheral direction. Finally, the system includes another compensator which corrects an energization level to nullify a deviation of an actual rotational speed with respect to the target rotational speed of the rotor.

These applications are assigned to the same assignee as the present application.

FIELD OF THE INVENTION

The invention relates to an energization control of an electric motor, and in particular, to an energization control which is suitable for use in driving a SR (Switched Reluctance) motor.

BACKGROUND OF THE INVENTION

A SR motor has advantages of a simple construction, as shown in FIG. 18 for an example. A rotor of the SR motor comprises a lamination of a number of thin iron sheets, and is formed with outwardly projecting eight poles Ra to Rh which are spaced apart by 45° around its outer periphery. A stator comprises a lamination of a number of thin iron sheets, and is formed with inwardly projecting twelve poles Sa to Sl, each of which carries an electical coil C. By monitoring an angle of rotation of the rotor and switching an energization of the coils C in synchronism with the rotation of the rotor, the rotor rotates. An example of SR motor is disclosed in Japanese Laid-Open Patent Application No. 298,940/1989.

A SR motor has advantages of a simple construction, a mechanical robustness and the capability of operation under an elevated temperature, but also has a number of shortcomings. One of the shortcomings relates to a high level of acoustic noises which are produced during the rotation. The turn-on or-off of the switching of the energization for each of the stator poles occurs in a SR motor when rotor poles assume a particular rotational position. Accordingly, the magnitude of a magnetic attraction applied to the rotor undergoes a rapid change during such switching, resulting in a mechanical oscillation of a relatively high level to the rotor and the stator, which gives rise to an acoustic noise.

The rotor of the SR motor shown in FIG. 18 has eight poles which are spaced apart by 45° around its outer periphery, thus a relative position of the rotor poles to the stator poles is the same after each rotation of 45° of the rotor. In another words, one of the rotor poles Ra to Rh faces to specific one (Sa for example) of the stator poles Sa to Sl, after every 45° rotation of the rotor and, the relative position of the rotor poles to the stator poles changes in the 45° rotation. An electrical cycle of 360° for controlling an energization of the stator coils C corresponds to the 45° rotation of the rotor. By repeating energization control for the electrical cycle, the motor rotates continuously.

Here, we define four coils disposed on the poles Sa, Sd, Sg, Sj in the stator as phase 1 (and denoted by reference character PH1), four coils on the poles Sb, Se, Sh, Sk as phase 2 (denoted by reference character PH2), and four coils disposed on the poles Sc, Sf, Si, Sl as phase 3 (and denoted by reference character PH3). When the rotor is at the position shown in FIG. 18 and electrical coils disposed on the poles Sc, Sf, Si, Sl as phase 3 are energized while another coils are deenergized, the stator poles Sc, Sf, Si, Sl are magnetized and attract the poles Rh, Rf, Rd, Rb of the rotor. The rotor then rotates clockwise. Then, by sequentially energizing the coils in a sequence as shown in FIG. 17a, it is possible to drive the rotor for continuous rotation. The rotational position of the rotor shown in FIG. 18 corresponds to an electrical angle 0° (=360°) in FIG. 17a.

A start timing of the energization of the coils are determined such that a sufficient level of an electric current flows in the coils at the time when the rotor poles to be attracted to the stator poles being energized begin to face to the latter poles. The start timing is shown in FIG. 17a as "current ON". The electric current is stopped before an attraction force between the stator pole and the rotor pole turns to opposite to an intended rotational direction of the rotor. A stop timing is shown in FIG. 17a as "current OFF". The start and stop timing is also determined by considering a rising up interval of the current at the start of the energization and a falling down interval at the stoppage of the energization. The rising up interval is a time interval from a switching ON ("current ON" in FIG. 17a) of a driver circuit to a timing at which the current of the coils increases up to a predetermined high level. The falling down interval is a time interval from a switching OFF ("current OFF" in FIG. 17a) of the driver circuit to a timing at which the current of the coils decreases to a predetermined low level. A current of substantially the same level is supplied to the coils of the phase 3, 2 and 1 in each interval starting from electric angle 0° to 120°, 120° to 240° and 240° to 360° (0°) respectively as shown in FIG. 17a for rotating the rotor continuously with an uniform torque.

Assuming that the rotor in FIG. 18 rotates clockwise direction by an electrical angle of 230° (230×45/360° rotation of the rotor) from the position shown in FIG. 18, the rotor poles Rb, Rd, Rf and Rh respectively moves to an edge of the stator poles Sa, SJ, Sg and Sd as shown in FIG. 20. Then it is preferable to energize the coils (phase 1) of the stator poles Sa, SJ, Sg and Sd. Considering the raising up interval, energization of the coils (phase 1) is started at an electrical angle of 200°. After a rotation to an electrical angle 360°, the rotor poles Rb, Rd, Rf and Rh respectively face to the stator poles Sa, SJ, Sg and Sd. This rotational position of the rotor is similar with that shown in FIG. 18. Thereafter the rotor poles Rb, Rd, Rf and Rh respectively leave from the stator poles Sa, SJ, Sg and Sd. If the stator poles Sa, SJ, Sg and Sd respectively attracts the rotor poles Rb, Rd, Rf and Rh, the attraction brakes the clockwise rotation. To prevent the braking, the energization of the coils of the stator poles Sa, SJ, Sg and Sd (phase 1) is stopped at an electrical angle of 320° considering the falling down interval for decreasing the current sufficiently low at the electrical angle 360°. As the result, the energization of the coils of phase 1 is started at 200° and stopped at 320°. The energization interval is 120° (electrical angle). Start and stop timing of the coils of phase 2 and 3 is similarly determined. The start and stop timing as described is named hereinafter as a standard start timing (or a standard energization ON angle) and a standard stop timing (or a standard OFF angle) respectively.

However, some SR motor produces a high level of acoustic noises at a specific rotational speed such as 1000 [rpm] for example. The level of noises declines at a higher rotational speed. It is important to reduce the noises.

As a result of numerous experiments, it is found that an adjustment of the stop timing of the energization of the coils (energization OFF angle) was effective to reduce the noises. For example, the stop ("current OFF") timing of the energization of the coils of phase 1 in FIG. 17a is determined at an electrical angle 320°. The level of noises declines by advancing the energization OFF angle to an electrical angle 280° as shown in FIG. 17b. However, actual energization interval become short and a torque of the rotor falls. This is a shortcoming for producing a high torque or for an acceleration of the rotor speed. In addition, the shortening of the energization interval causes a blank interval wherein the all coils (phase 1, 2 and 3) are not energized. The torque of the rotor ripples at a low speed range, 500 [rpm] for an example, due to the blank of the energization.

SUMMARY OF THE INVENTION

Accordingly, an object of the invention is to decline the level of the noises and realize a smooth rotation of the rotor with respect to a various rotational speed and torque as desired.

In accordance with the invention, the energization OFF angle is adjusted, for preventing the generation of the high level of acoustic noises, such that the energization OFF angle advances from the standard energization OFF angle in inverse proportion to the rotational speed when the rotational speed is over a predetermine value (Rbase), and decreases in proportion to the rotational speed when the rotational speed is under the predetermined value for preventing the generation of the high level of acoustic noises.

In this manner, when the rotational speed of the rotor is around the predetermined value, the energization OFF angle is much advanced from the standard energization OFF angle. This prevents the generation of the high level of acoustic noises. When the rotational speed of the rotor is under the predetermined value, the advance of the energization OFF angle decreases in proportion to the rotational speed. This prevents increase of the blank interval at a low rotational speed, thus the torque ripple of the rotor at the low speed is prevented. In addition, when the rotational speed of the rotor exceeds the predetermined value, the advance of the energization OFF angle decreases in inverse proportion to the rotational speed. This prevents decrease of the torque at a high rotational speed.

In a preferred embodiment of the invention, the advance of the energization OFF angle is adjusted responding to the rotational speed of the rotor as described above and additionally adjusted with a, target torque such that the advance is reduced in proportion to the target torque for compensating a reduction of the motor torque due to the advance of the energization OFF angle.

In the preferred embodiment of the invention, the current level is increased corresponding to the rotational speed of the rotor for compensating a reduction of the torque by the advance of the energization OFF angle.

In the preferred embodiment of the invention, an energization map memory stores timing values of the energization OFF angle in a manner corresponding to the rotational speed of the rotor and the target torque. A controller reads a timing value which corresponds to the rotational speed of the rotor and a target torque from the energization map memory and determines the energization OFF angle with the timing value read from the memory. The controller can determine an optimum energization OFF angle without processing a complex calculation.

Other objects and features of the invention will become apparent from the following description of an embodiment with reference to the attached drawings.

BRIEF DESCRIPTION OF THE DRAWINGS

FIG. 5a is a series of timing charts of a signal generated by the circuit 15 shown in FIG. 1b on the basis of data contained in its memory 49, and output currents delivered to the electrical coils of an electric motor 1 when it is driven for rotation in the forward direction and which are produced by the first to the third phase driver 18 to 20 shown in FIG. 1a based on the signal from the circuit 15, the charts indicating an approximate level change of such current;

FIG. 7b is a series of timing charts of electrical signals representing data applied from an angle sensor 1d shown in FIG. 1b to CPU 11, principally indicating a change occurring therein;

FIG. 8 is a series of timing charts indicating changes occurring in various electrical signals within the direction detector circuit 5 shown in FIG. 7a;

FIG. 11b is a timing chart indicating a change occurring in the signal Vs6 in a mode when an output from the timing control circuit 17c of the output decision circuit 17 shown in FIG. 2 is applied to the phase 1 driver 18;

FIG. 13 is a timing chart of PWM pulse which is produced in accordance with P34, one of items contained in data (Table 1) stored in PWM map memory 13b which is shown in FIG. 1a;

FIG. 17a is a series of timing charts, illustrating a fundamental waveform of standard start and energization OFF angle of current passed through the electrical coils of the moto shown in FIG. 1a;

FIG. 17b is a series of timing charts, illustrating a adjusted waveform of advanced energization OFF angle of current passed through the electrical coils of the motor shown in FIG. 1a;

FIG. 19 is a graph showing a relationship between the rotational speed and the target torque and an advance correction of the energization OFF angle which is shown as "current OFF" in FIG. 17a;

FIG. 21a graphically shows a current waveform formed according to data (Table 3) of pattern No. 1 stored in a waveform map memory 13c shown in FIG. 1a;

FIG. 22 graphically shows a current flow through an electrical coil of the motor 1 shown in FIG. 1a which is produced in accordance with one item, C34, of data (Table 2) stored in the current map memory 13a shown in FIG. 1b;

FIG. 25a is a graph showing an alteration of an acceleration of the rotor of the SR motor 1 shown in FIG. 1a;

FIG. 25b is a graph showing an alteration of a rotational speed of the rotor of the SR motor 1 shown in FIG. 1a;

FIG. 26a is a graph showing an alteration of a current level of the motor 1, which is adjusted responding to the alteration of the acceleration as shown in FIG. 25a;

FIG. 26b is a graph showing an alteration of a feedback error, which is calculated responding to the alteration of the acceleration as shown in FIG. 25a;

FIG. 27 is a series of timing charts, illustrating a fundamental waveform of the standard energization OFF angle of current passed through the electrical coils of the motor shown in FIG. 1a; and FIG. 28 is a graph showing a relationship between the torque and the rotational speed of the SR motor 1.

DESCRIPTION OF PREFERRED EMBODIMENT

Figure 1A:
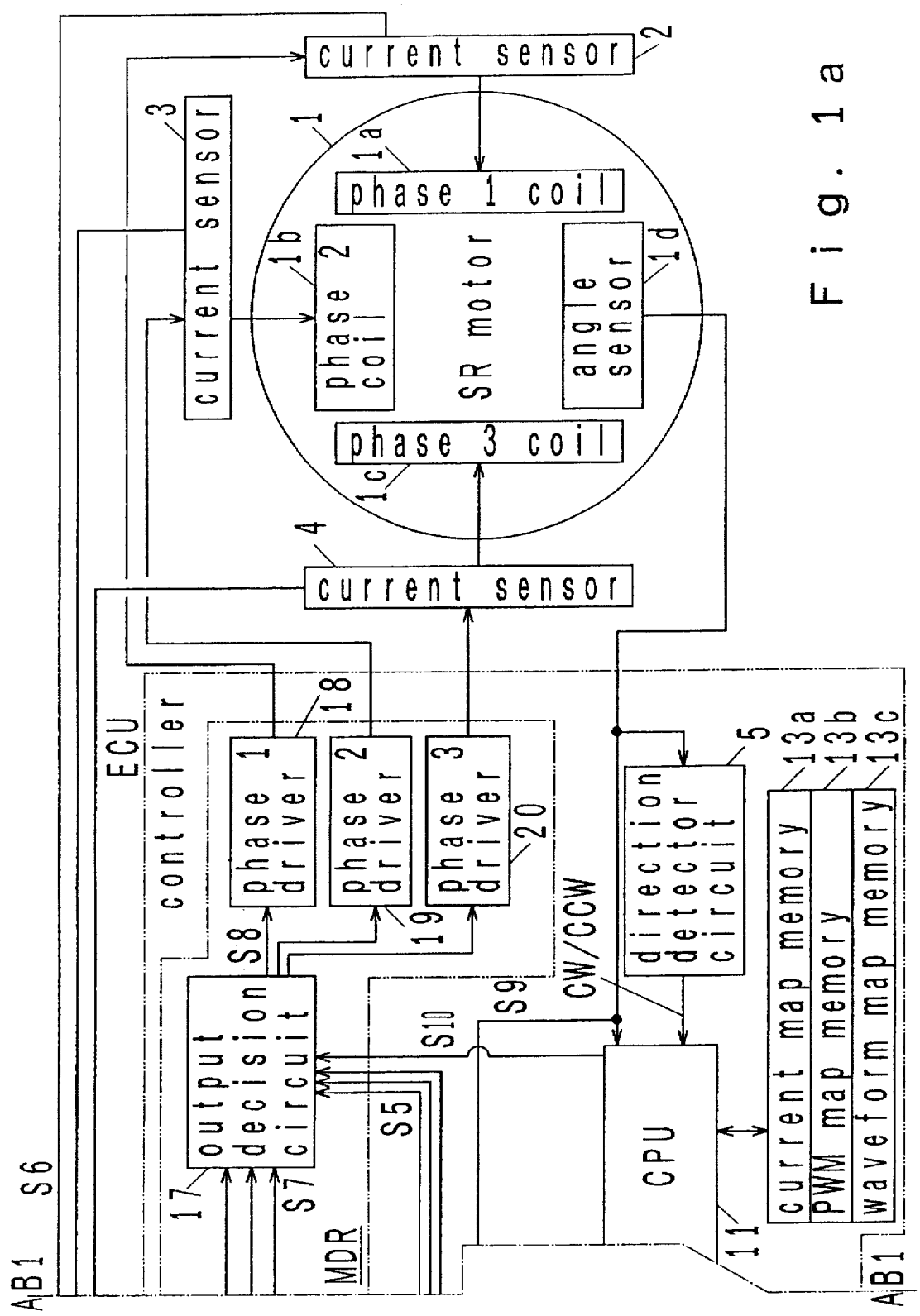
FIG. 1a is a block diagram of substantially right-half of an embodiment of the invention.
Figure 1B:
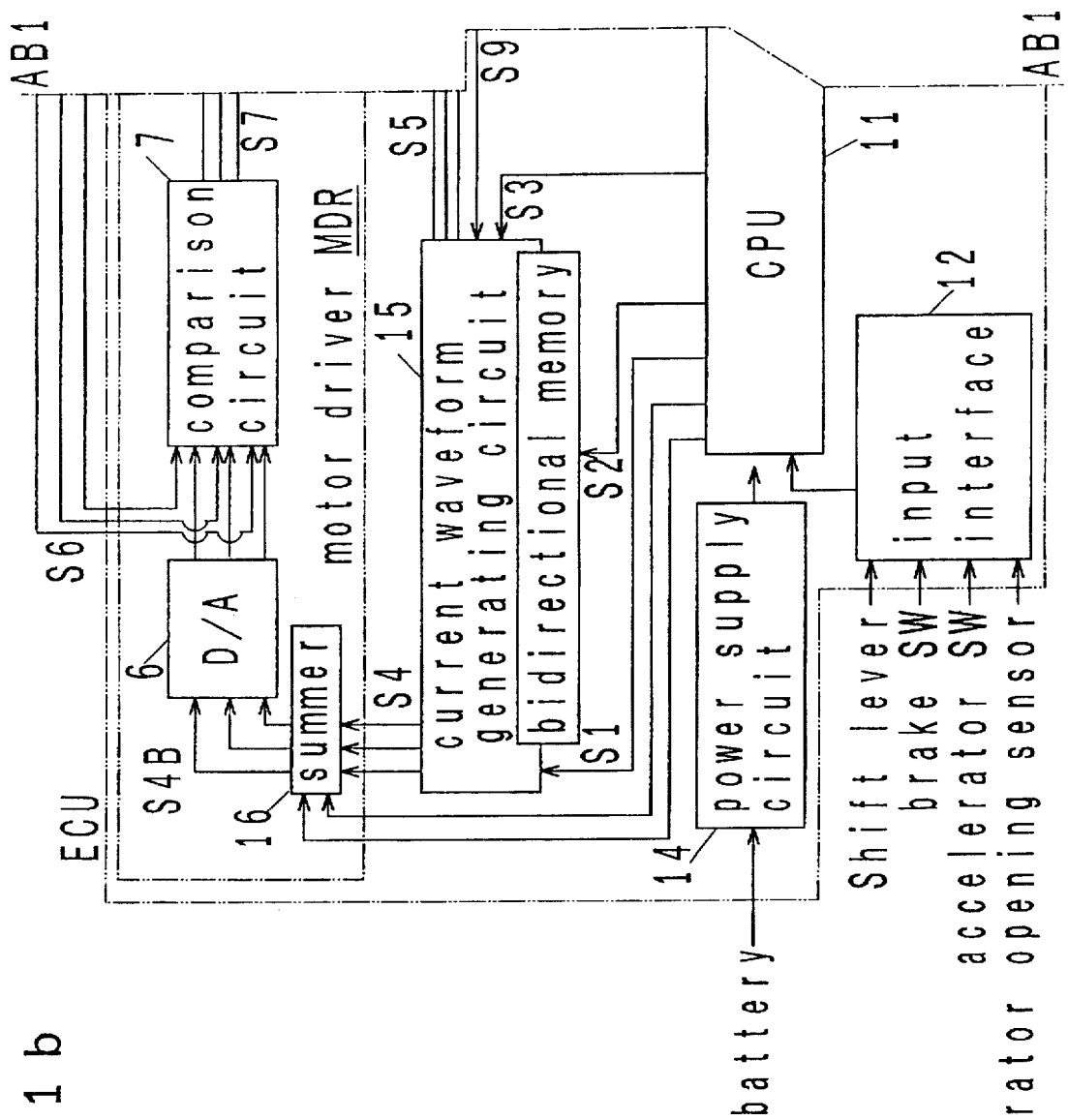
FIG. 1b is a block diagram of substantially left-half of the embodiment, FIGS. 1a and 1b being joined together along a line AB1—AB1 to represent the entire embodiment of the invention in one block diagram.

An SR motor unit comprising a combination of an SR motor 1 and a controller ECU shown in FIGS. 1a and 1b constitutes an essential portion of a drive unit for an electric car. In the example shown, a single SR motor 1 is provided as a drive source, and is controlled by the controller ECU. The controller ECU controls the driving of the SR motor 1 on the basis of information which is fed from a shift lever, a brake switch, an accelerator switch and an accelerator opening sensor. It will be seen that a storage battery is utilized as a power supply.

Figure 18:
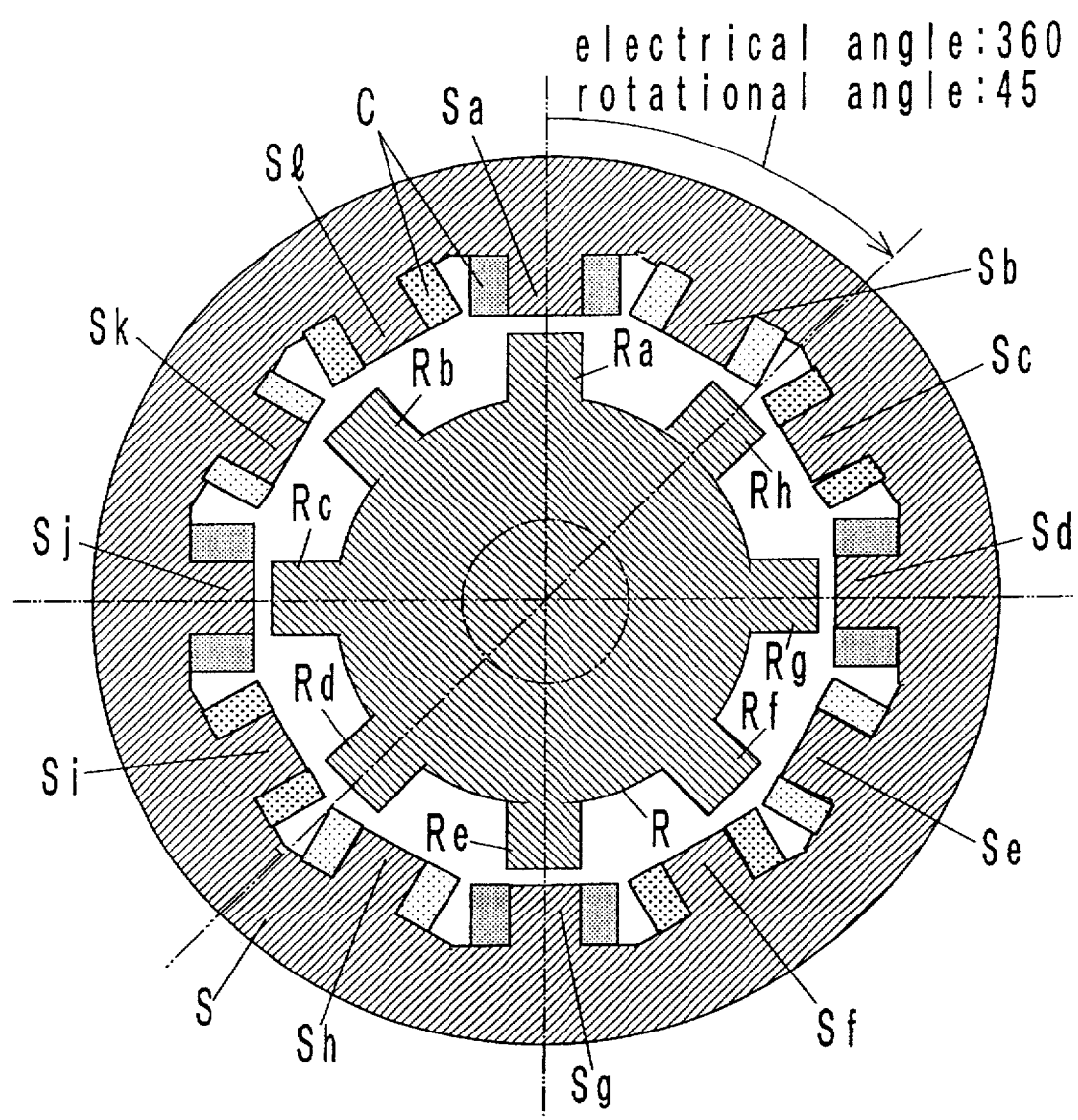
FIG. 18 is a section view showing a basic structure of an SR motor 1 shown in FIG. 1a, illustrating the motor at the start of energization of phase 3 coil.

The basic construction of the SR motor 1 is illustrated in FIG. 18. The motor 1 shown in FIG. 18 comprises a stator S, and a rotor R which is rotatably supported within the internal space of the stator S. The rotor R comprises a lamination of a number of thin iron sheets, and is formed with outwardly projecting eight poles Ra to Rh at locations which are spaced apart by 45° around its outer periphery. The stator S also comprises a lamination of a number of thin iron sheets, and is formed with inwardly projecting twelve poles Sa to Sl at locations which are spaced apart by 30° around its inner periphery. Each pole Sa to Sl of the stator S has an electrical coil C disposed thereon.

As described, the coils each of which is disposed on the stator poles Sa, Sd, Sg and Sj respectively are denoted as phase 1 and denoted by reference character 1a in FIG. 1a, the coils each of is disposed on the stator poles Sb, Se, Sh and Sk respectively are denoted as phase 2 and denoted by reference character 1b in FIG. 1a and the coils each of which is disposed on the stator poles Sc, Sf, Si and Sl respectively are denoted as phase 3 and denoted by reference character 1c in FIG. 1a.

By sequentially energizing the coils 1a to 1c in the sequence of phase 1-phase 2-phase 3 depending on the position of the poles on the rotor R as illustrated in FIG. 17a or FIG. 17b, it is possible to drive the rotor R for continuous rotation in the clockwise direction. Thus, a pole on the stator S which is energized constitutes an electromagnet, and accordingly a pole on the rotor R which is located close to the electromagnet is attracted thereby for rotational movement. To continue such rotation, it is necessary to switch the energization of the coils as the rotational movement of the rotor R proceeds. In actuality, for the SR motor 1, the coils which are energized may be switched in the sequence of phase 1-phase 2-phase 3 as the rotor R rotates through 15°.

Referring to FIG. 1a, the SR motor 1 is provided with three phase coils 1a, 1b, 1c which are used for driving purpose, and an angle sensor 1d which detects a rotational position or angle of rotation of the rotor R. The three phase coils 1a, 1b and 1c are connected to respective phase drivers 18, 19 and 20, respectively, which are contained in a motor driver MDR within the controller ECU. Current sensors 2, 3 and 4 are connected in signal line joining the coil 1a and the driver 18, a signal line joining the coil 1b and the driver 19, and a signal line joining the coil 1c and the driver 20. Each of these current sensors 2, 3 and 4 delivers a current signal S6 in the form of a voltage which is proportional to an actual current flow through each of the coils 1a, 1b and 1c. In the present embodiment, the angle sensor 1d used is TS2028N94E21 manufactured by Tamagawa Seiki. The angle sensor 1d delivers a binary signal having 11 bits representing an absolute value of an angle from 0° to 360°, as shown in FIG. 7. The resolution of an angle detected is 0.35°. Thus, one unit of detected angle data is 0.35°.

The controller ECU contains CPU (microcomputer) 11, an input interface 12, a current map memory 13a, PWM map memory 13b, a waveform map memory 13c, a power supply circuit 14, a current waveform generating circuit 15, a summer 16, a direction detector circuit 5, D/A converter 6, a comparison circuit 7, an output decision circuit 17, and drivers 18, 19 and 20. On the basis of information which are fed from a shift lever, a brake switch, an accelerator switch and an accelerator opening sensor, the controller ECU sequentially calculates a driving speed and a driving torque of the SR motor 1, and controls the magnitude of current passed through each of the coils 1a, 1b and 1c of the motor 1 based on the results of such calculation.

Figure 2:
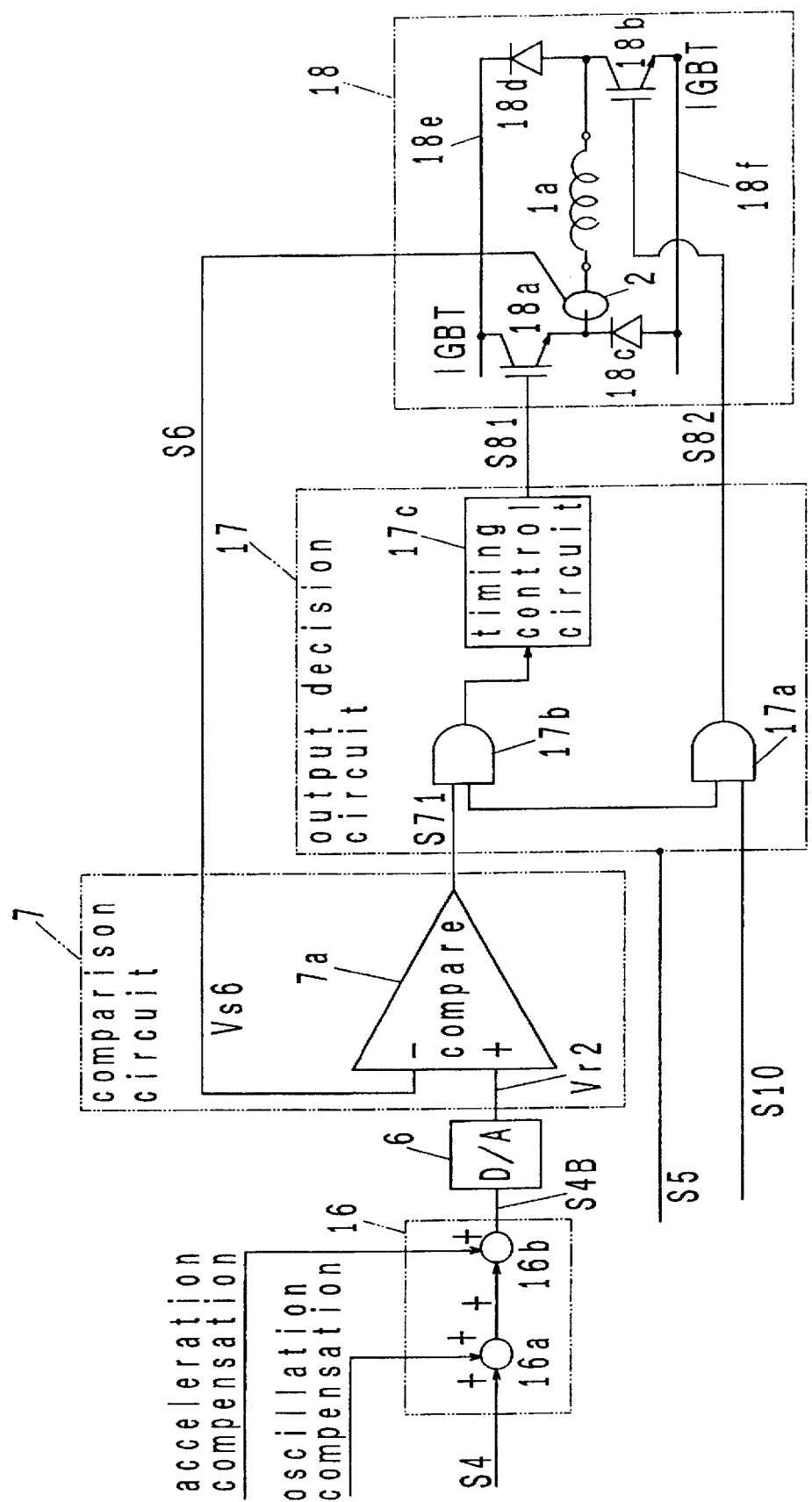
FIG. 2 is a circuit diagram showing a summer 16, a comparison circuit 7, an output decision circuit 17 and a first phase driver 18 shown in FIGS. 1a and 1b.

FIG. 2 specifically shows part of the circuit shown in FIGS. 1a and 1b. It is to be noted that FIG. 2 shows only the circuit which controls the energization of phase 1 coil 1a, but that in actuality, similar circuits for controlling the energization of phase 2 and phase 3 coils 1b and 1c are also provided.

Referring to FIG. 2, phase 1 coil 1a has its one end connected through a switching transistor IGBT (18a) to a high potential line 18e of a power supply while the other end of the coil 1a is connected through a switching transistor IGBT (18b) to a low potential line 18f of the power supply. A diode 18c is connected across the emitter of the transistor 18a and the line 18f while a diode 18d is connected between the collector of the transistor 18b and the line 18e. Accordingly, when the transistors 18a and 18b are both turned on, a current flow is established across the lines 18e, 18f through the coil 1a. If either one or both of the transistors are turned off, the energization of the coil 1a can be interrupted.

The output decision circuit 17 includes a pair of AND gates 17a, 17b and a timing control circuit 17c. An output terminal of the gate 17a is connected to the gate of the transistor 18b while an output terminal of the gate 17b is connected to an input of the timing control circuit 17c. An output of the timing control circuit 17c is connected to the gate of the transistor 18a. Signals S10 and S5 are fed to the input terminals of the gate 17a while a signals S71 and S5 are fed to the input terminals of the gate 17b. Signal S71 is a binary signal delivered by an analog comparator 7a contained in the comparison circuit 7. Signal S5 is a binary signal (on/off signal) delivered by the current waveform generating circuit 15.

An analog voltage Vr2, representing a sum of a reference current value S4 delivered from the circuit 15, an oscillation compensating value and an acceleration compensating value, which are summed in the summer 16, and converted by D/A converter 6, is applied to one of input terminals of the analog comparator 7a while a voltage (Vs6) of a signal S6 which corresponds to the current detected by the current sensor 2 is applied to the other input terminal. The analog comparator 7a delivers a result of comparison between the voltages Vr2 and Vs6 as a binary signal (pulse signal) S71.

When the signal S5 is at a high level H (enabling energization), the turn-on/-off of the transistor 18a is controlled in accordance with the binary signal S71 delivered from the analog comparator 7a. However, it is to be noted that the turn-on/-off of the binary signal S71 is not in a one-to-one correspondence with respect to the turn-on/-off of the transistor 18a, but that the timing is adjusted by the timing control circuit 17c, as will be further described later. When the signal S5 is at its high level R the transistor 18b in the driver 18 is turned on or off in accordance with the binary signal S10 fed to the gate 17a. The binary signal S10 is produced within CPU 11, having a fixed period (15 kHz) and a variable duty cycle, which is modified as required by CPU 11. Actually, CPU 11 delivers the binary signal S10 having a value of duty cycle, by accessing Table 1 contained in the PWM map memory 13b to read data thereof on the basis of the prevailing number of revolutions (rpm) and the required driving torque of the motor.

Thus, in this embodiment, the transistors 18a and 18b are independently turned on or off in accordance with the control signals S81 and S82 which are independent from each other, so that the driver 18 has three states, namely, when transistors 18a, 18b are both on, when they are both off, and when one of them is on while the other is off.

For example, when commencing the energization, assuming that the transistor 18b is on, as the current reference level Vr2 is changed from 0 to Iref, it follows that Vr2>Vs6. Accordingly, the transistor 18a is initially turned on, and the current flow through the coil 1a gradually increase from 0 with a slope which is determined by the characteristics or time constants of the drive circuit and the load As the current passing through the load reaches Iref, the transistor 18a is repeatedly turned off and on, thus controlling the maximum value of the current so that it remains substantially equal to Iref. When the energization is to be terminated, as the reference current value is changed from Iref to 0 it follows that Vr2<Vs6. Accordingly, the transistor 18a is turned off, and the current flow through the coil 1a gradually decreases with the slope which is determined by the characteristics of the driving circuit and the load until it reaches 0.

Figure 12:
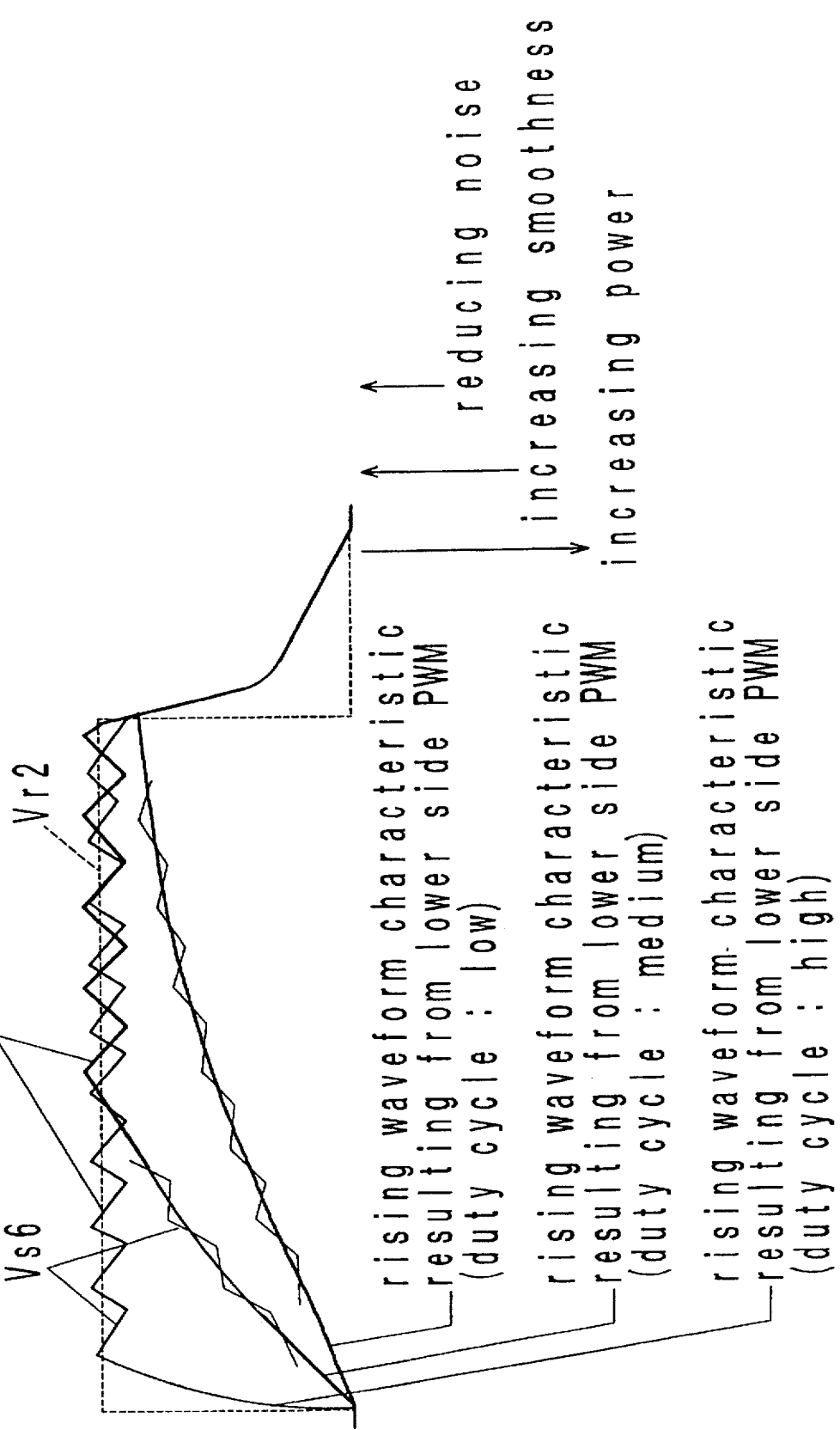
FIG. 12 is a timing chart indicating a change occurring in the signal Vs6 as contrasted to a reference level Vr2 delivered from D/A converter 6 shown in FIG. 2.

However, in practice, since the control signal S82 applied to the transistor 18b is a pulse signal, there exists a time interval during which the transistor 18b is off even during the rising interval at the commencement of the energization, whereby the coil current rising curve is influenced accordingly. Specifically, FIG. 12 shows a change in the coil current rising curve which occurs in accordance with the duty cycle of the control signal S82 applied to the transistor 18b. During the falling interval at the termination of the energization, there exists a time interval during which the transistor 18b is off and the time interval during which the transistor 18b is on, and hence the falling curve of the coil current changes in accordance with the ratio of these intervals.

Figure 23A:
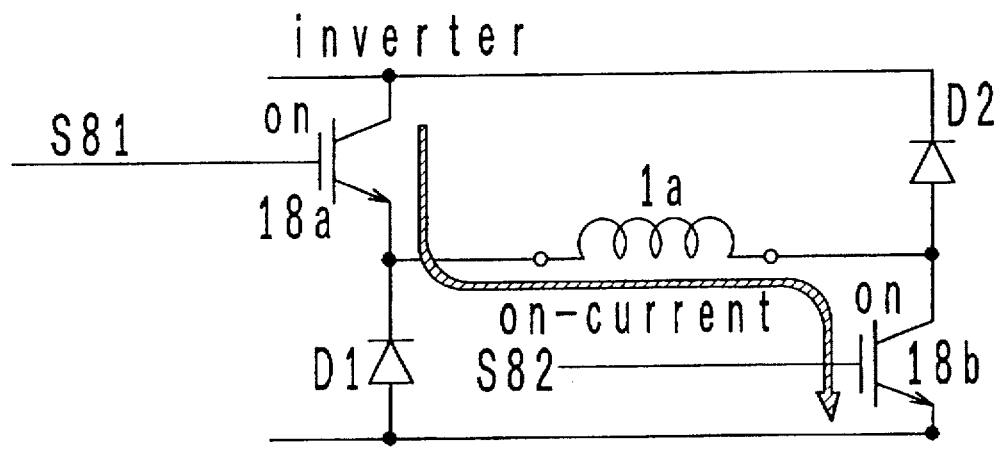
FIG. 23a is a circuit diagram showing the direction of current flow through phase 1 driver 18 when the output decision circuit 17 shown in FIG. 2 delivers signals S81, S82, representing the energization command level to the phase 1 driver 18.
Figure 23B:
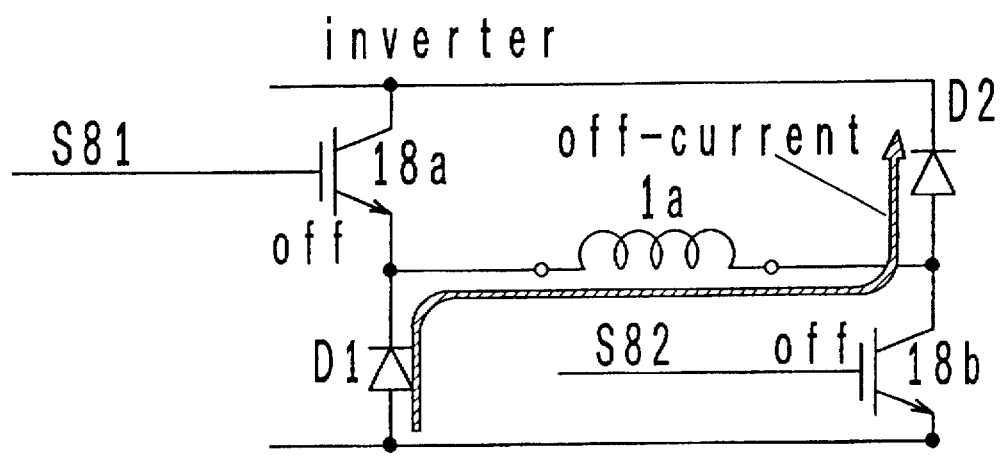
FIG. 23b is a similar circuit diagram showing the direction of current flow through the phase 1 driver 18 immediately after the output decision circuit 17 has switched the signals S81, S82 to the phase 1 driver 18 to deenergization command level.

This will be described in further detail with reference to FIGS. 23a to 23c and 24a to 24c. When the transistors 18a and 18b are both turned on to pass a current through the coil 1a as shown in FIG. 16a, if the both transistors 18a, 18b are turned off as shown in FIG. 23b, the energy stored in the coil 1a causes a current flow through diodes D1, D2 from the low potential line to the high potential line of the power supply. At this time, there is a large potential difference across the opposite ends of the coil 1a, whereby the energy is released rapidly, accelerating the rate at which the current decays. Accordingly, the falling slope of the transient current curve is steep, as indicated in FIG. 23c.

Figure 24A:
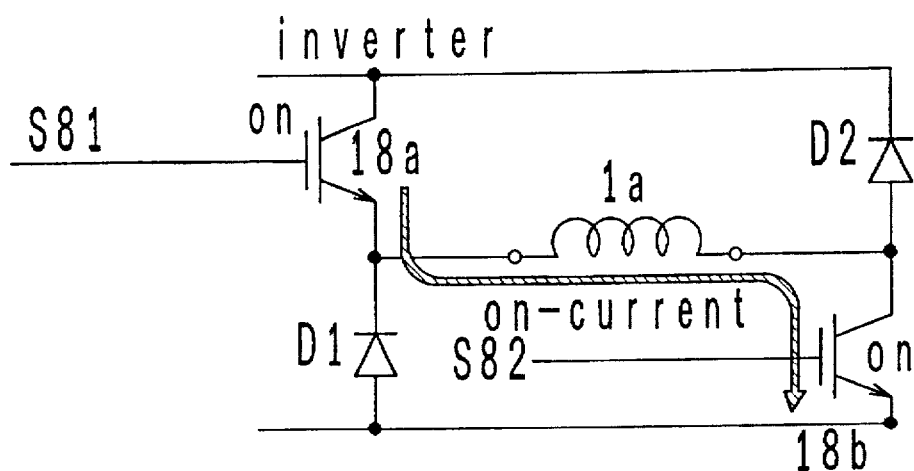
FIG. 24a is a circuit diagram indicating the direction of current flow through the phase 1 driver 18 when the decision circuit 17 applies energization command level signals S81, S82 to the driver 18.
Figure 24B:
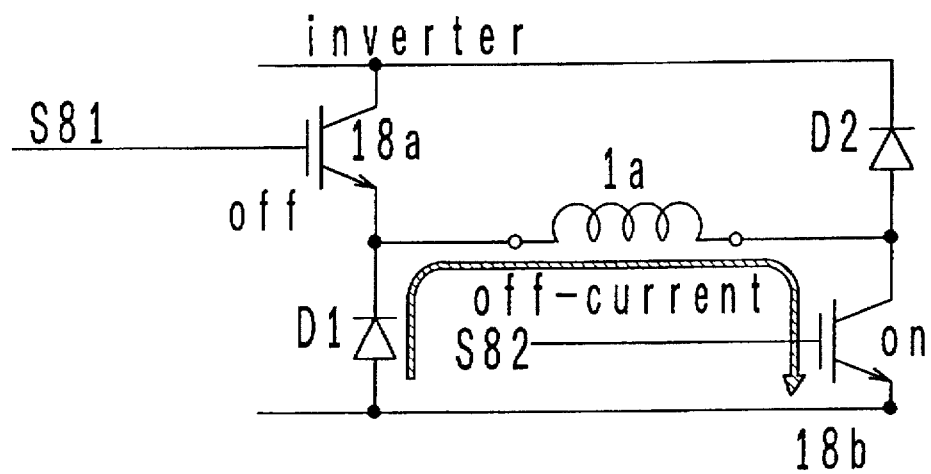
FIG. 24b is a similar circuit diagram indicating the direction of current flow through the phase 1 driver 18 which occurs immediately after the decision circuit 17 has switched only one, S81, of the signals S81, S82 to the phase 1 driver 18 to the deenergization command level.

On the other hand, when the transistors 18a, 18b are both turned on to pass a current through phase 1 coil 1a as shown in FIG. 24a, and then only one of the transistors, 18a, is turned off as indicated in FIG. 24b, the presence of the other transistor 18b which remains on causes a current flow which results from the energy stored in the coil 1a to pass through a closed loop including diode D1, coil 1a and transistor 18b. At this time, a potential difference across the ends of the coil 1a is reduced, and hence the release of energy takes place in a gentle manner, and the rate at which the current decays is slow. Accordingly, the falling slope of the transient current curve is reduced as shown in FIG. 24c.

In this manner, by adjusting the duty cycle of the control signal S82 applied to the transistor 18b, it is possible to control the rising and the falling waveform of the coil current.

Figure 23C:
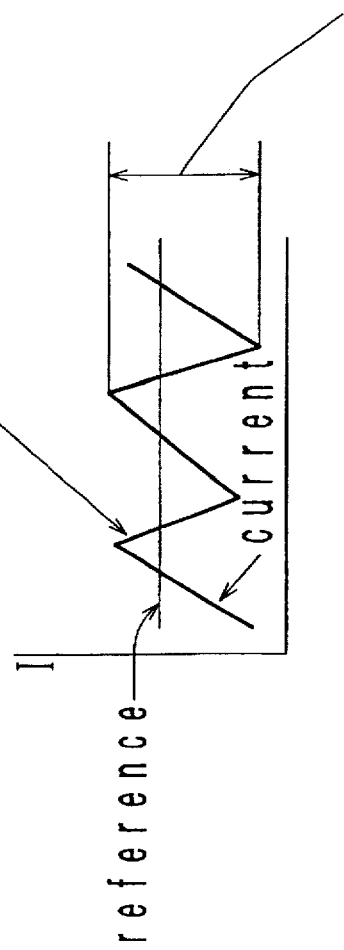
FIG. 23c graphically shows a change in the current flow through the electrical coil of the motor when the energization shown in FIG. 23a and the deenergization shown in FIG. 23b are alternately repeated.
Figure 24C:
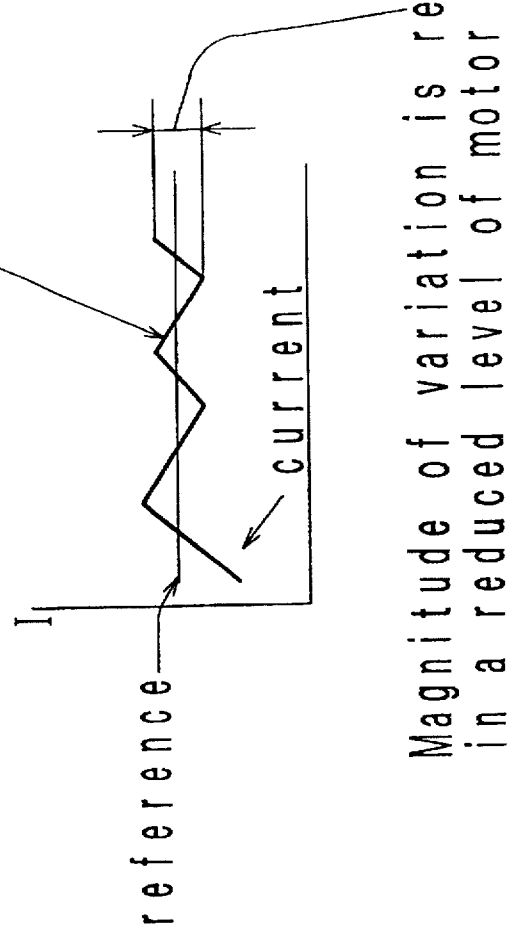
FIG. 24c graphically shows a change occurring in the current through the electrical coil of the motor when the energization shown in FIG. 24a and the deenergization shown in FIG. 24b are alternately repeated.

When a chopping control is carried out in accordance with the binary signal S71 delivered from the comparator 7a, there results an increased magnitude of variation in the current as shown in FIG. 23c when the falling rate of the coil current is relatively fast, and a reduced magnitude of variation in the current as shown in FIG. 24c if the falling rate of the current is relatively slow. By reducing the magnitude of variation in the current, mechanical oscillation and acoustical noises which occur during the rotation of the SR motor can be drastically reduced.

However, a slow falling rate of the current is likely to cause a tracking lag of the current with respect to a target value when a target value (reference level) of the chopping control is changed. It is necessary to change the current level used with the motor as a driving torque or the target torque is changed. In particular, when the SR motor is driven, it is necessary to switch the energization/deenergization of each coil in accordance with the position of poles on the rotor (or angle of rotation), and hence if a tracking lag of the current with respect to the target value occurs, a reduction in the rotating torque will be remarkable, in particular, when the motor is rotating at a high speed.

In the present embodiment, the duty cycle of the signal S10 is automatically adjusted on the basis of the number of revolutions (rpm) and the required driving torque or the target torque of the motor. Accordingly, when the number of revolutions is high or when an increased driving torque is required, the rising rate of energization is accelerated, thus preventing a tracking lag of the current with respect to a change in the target value from occurring. On the other hand, when the number of revolutions is low or when an increased driving torque is not required, the rising or falling rate of the coil current is slow, whereby the generation of mechanical oscillation and acoustical noises is suppressed. While it is difficult to provide a fine adjustment of the waveform of the current reference level (Vr2) in a reduced time interval, it is a simple matter to adjust the duty cycle of the signal S10.

The transistor 18a normally repeats a turn-on and turn-off with a short period in accordance with the result of comparison determined by the comparator 7a. However, if the signal S71 delivered from the comparator 7a is directly applied to the transistor 18a, the on/off interval of the transistor 18a will be governed by the characteristics of the energization circuit including the transistor 18a, the impedance of the coil 1a or the like, and thus is subject to the influences of an environmental change such as temperature or humidity. In some instance, the on/off frequency of the transistor 18a may become abnormally high. When the frequency with which the energization is turned on and off increases, there results an increased loss in the transistor 18a, and hence in the heating value thereof. Conversely, when the frequency with which the energization is turned on and off is lower than the upper limit of the audible frequencies to a human being, mechanical oscillation which results from the switching of the current is audible as noises. Accordingly, it is desirable to control the on/off frequency of the transistor 18a so that it be slightly higher than the upper limit of audible frequencies to the human being (for example, 15 kHz).

Figure 11A:
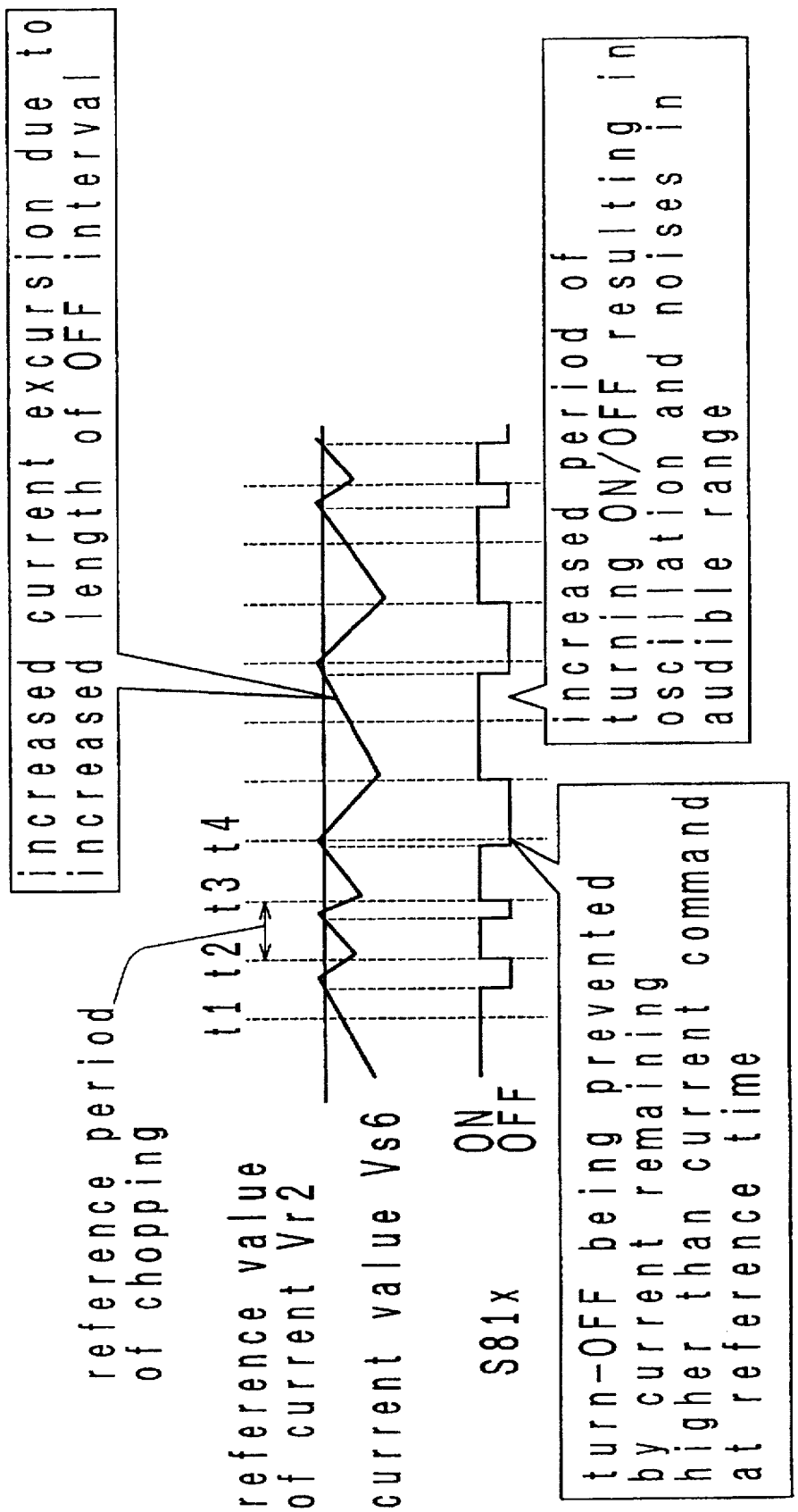
FIG. 11a is a timing chart indicating a change occurring in a signal Vs6 representing a current passing through an electrical coil 1a of the motor 1 within the output decision circuit 17 shown in FIG. 2 in a mode in which the timing control circuit 17c is eliminated and an output from AND gate 17b is applied to phase 1 driver 18.

In order to control the on/off frequency of the transistor 18a, the control shown in FIG. 11a has been constructed before making a mock-up according to the embodiment. Referring to this Figure, a sync signal having a fixed period is used to define timings t1, t2, t3, - - - , and a signal S81x applied to the transistor 18a is turned off each time the inequality Vr2<Vs6 applies. If Vr2>Vs6 at each of timings t1, t2, t3, - - - , the signal S81x is switched on.

However,if Vr2≦Vs6, the signal S81x is maintained off. With this control (used for purpose of comparison), when the inequality Vr2<Vs6 is established immediately before the timing (t4) of the sync signal, the signal S81x is maintained off because the inequality Vr2<Vs6 applies at the timing t4, with consequence that the signal S81x remains on or off over a prolonged period of time without experiencing a switching therebetween. This resulted in an occurrence that the on/off frequency of the transistor 18a becomes lower than the upper limit of the audible frequency to the human being.

To take this into consideration, in the present embodiment, an improved timing control circuit 17c is employed to effect a control as illustrated in FIG. 11b. Specifically, a sync signal having a fixed period is used to define timings t1, t2, t3, - - - . A signal FE is switched to a high level H (disabling "on") whenever the inequality Vs6>Vr2 applies and is switched to a low level L (enabling "on") at each of the timings t1, t2, t3, - - - of the sync signal. The requirement to turn the signal S81 off is that the inequality Vs6>Vr2 applies, and the requirement to turn the signal S81 on is that the signal FE enables "on" and Vs6≦Vr2. With such control of the embodiment, if Vr2<Vs6 immediately before the timing (t4) of the sync signal and Vr2<Vs6 immediately thereafter or at the timing (t4) of the sync signal, the signal S81 is switched on if Vs6>Vr2 applies after the signal FE is switched to enable "on". Accordingly, the on/off period of the signal S81 will be substantially equal to the period of the sync signal or the reference chopping period, preventing any significant change in the frequency. Accordingly, by choosing the frequency of the sync signal slightly higher than the upper limit of the audible frequencies to the human being, the generation of noises of audible frequencies can be prevented while preventing the occurrence of significant heating.

Figure 3:
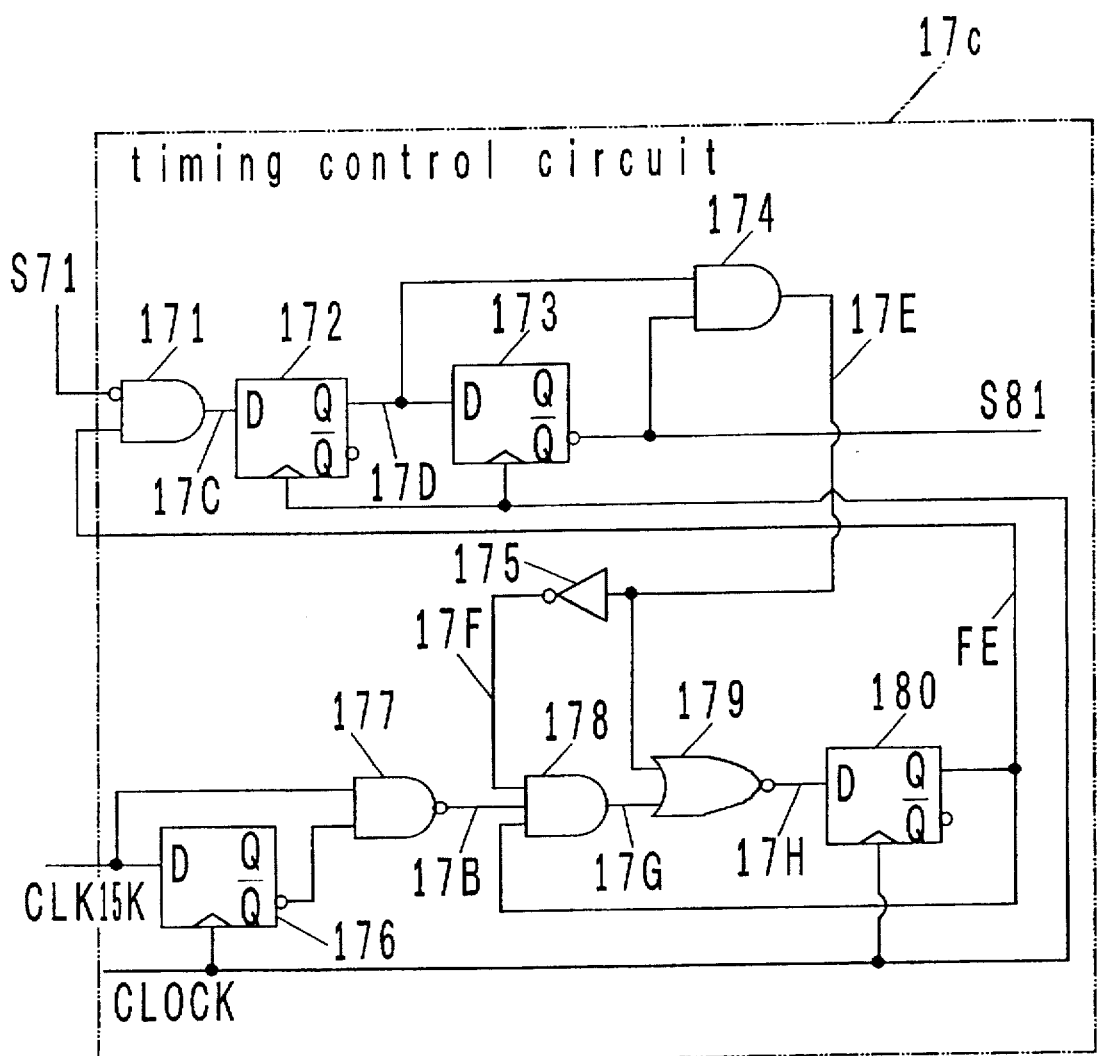
FIG. 3 is a circuit diagram of a timing control circuit 17c shown in FIG. 2.
Figure 10:
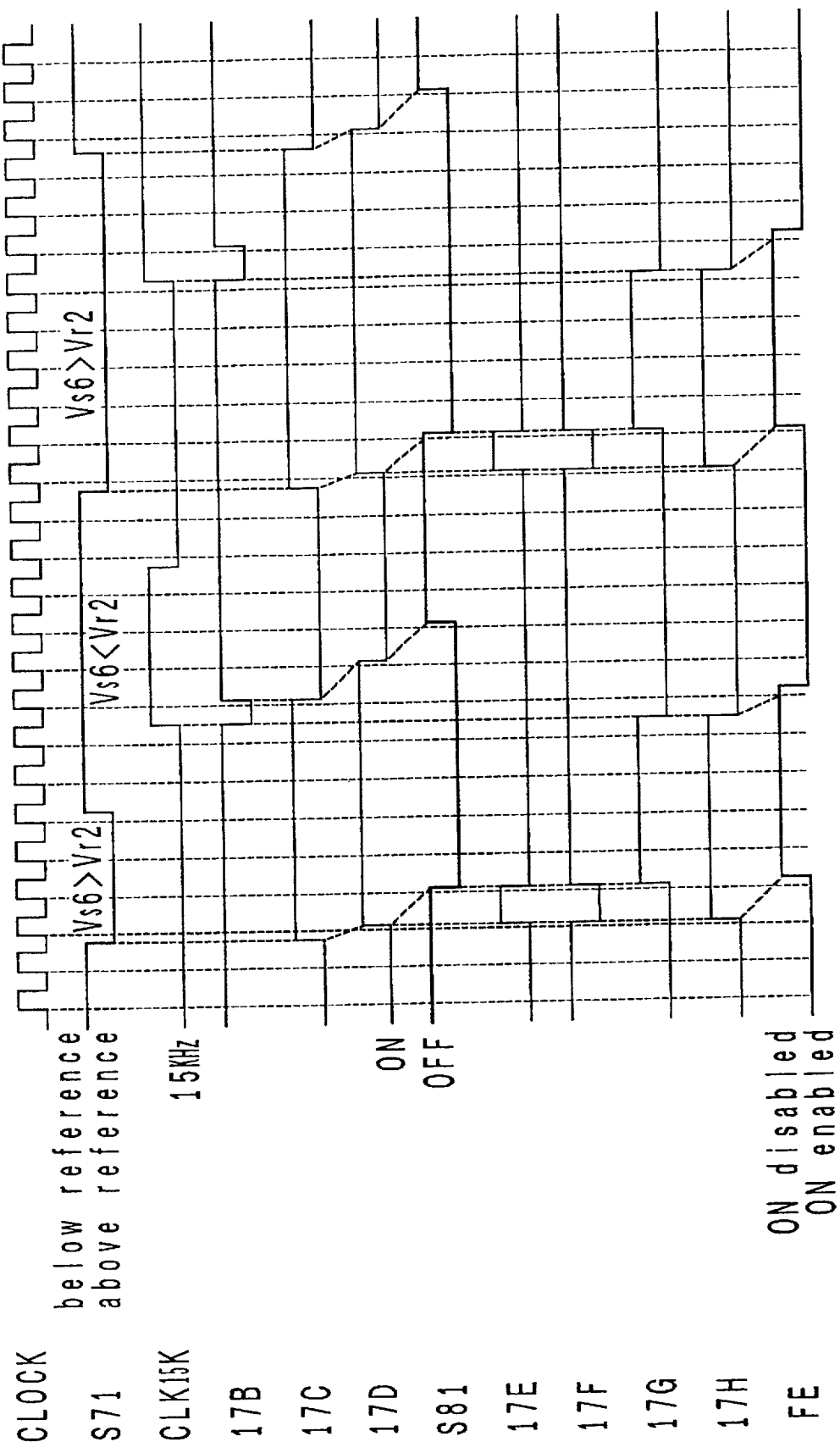
FIG. 10 is a series of timing charts indicating changes occurring in various electrical signals produced within the timing control circuit 17c shown in FIG. 3.

The arrangement of the timing control circuit 17c is specifically shown in FIG. 3, and waveforms of various signals appearing in the circuit are shown in FIG. 10. In this embodiment, a sync signal CLK15K comprises a pulse signal having a frequency of 15 kHz. The circuit shown in FIG. 3 comprises gate circuits 171, 174, 177, 178 and 179; D-type flip-flops 172, 173, 176 and 180; and an inverter 175. As shown in FIG. 10, the signal FE is switched to 'disable "on"' whenever the input signal S71 satisfies Vs6>Vr2, and switched to 'enable "on"' at the timing of the rising edge of the sync signal CLK15K of 15 kHz. The signal S81 is switched off when the input signal S71 satisfies Vs6<Vr2, and is switched on after the 'disable "on"' of the signal FE is terminated and when the input signal S71 satisfies Vs6<Vr2. Accordingly, using the timing control circuit 17c, a conduction command signal S81 having a period equal to or less than a given value, as shown in FIG. 11b, is applied to phase 1 driver 18.

In order to enable an acceleration of the rotational speed of the motor 1 to track a target acceleration accurately, it is desirable to implement a feedback control of the acceleration. In the present embodiment, the current value supplied to the motor 1 is controlled by controlling the current reference level Vr2 which is fed to the comparator 7a. However, to enable a minute current waveform to be controlled, a current value (reference level Vr2) corresponding to an angle is determined for every minute or incremental angle of rotation (0.7°, namely, twice the unit 0.35° of detected angle data) of the motor 1. Hence, if the energization of the motor is adjusted as the number of revolutions (rpm) or required torque (the target torque) is changed, current values for all the angles must be calculated for each phase coil, and these values must be used to update the memory. Thus, an updating of controlled variables is very time consuming, which retards the response of the control system. If an acceleration feedback control is included into the control system which adjusts such number of current of values (namely, current waveform generating circuit 15), a rapid response to any change in the acceleration cannot be expected.

Accordingly, in the present embodiment, a separate acceleration feedback control (FIG. 16) is implemented independently from a current waveform generating system. Thus, referring to FIG. 2, an acceleration compensation value produced by the acceleration feedback control (FIG. 16) is added to the output signal S4 from the current waveform generating circuit 15 in the summer 16. Since the acceleration feedback control (FIG. 16) is processed in a timer interruption (FIG. 15), the acceleration control has a rapid response.

In addition to the acceleration compensation value, an oscillation compensation value is also added in the summer 16 to the output signal S4 from the circuit 15. The purpose of the oscillation compensation value is to suppress a minute oscillation of the rotor of the motor 1 in the peripheral direction or in the rotational direction. In an experiment conducted by the inventor, it is confirmed that when the rotor of the SR motor 1 is being driven in a given direction, for example, for clockwise rotation, the rotor momentarily oscillates, namely, rotates counter-clockwise when viewed microscopically. If such oscillation which results from the reverse rotation can be suppressed, the SR motor 1 will be driven more smoothly, reliably reducing the level of acoustic noises.

Figure 7A:
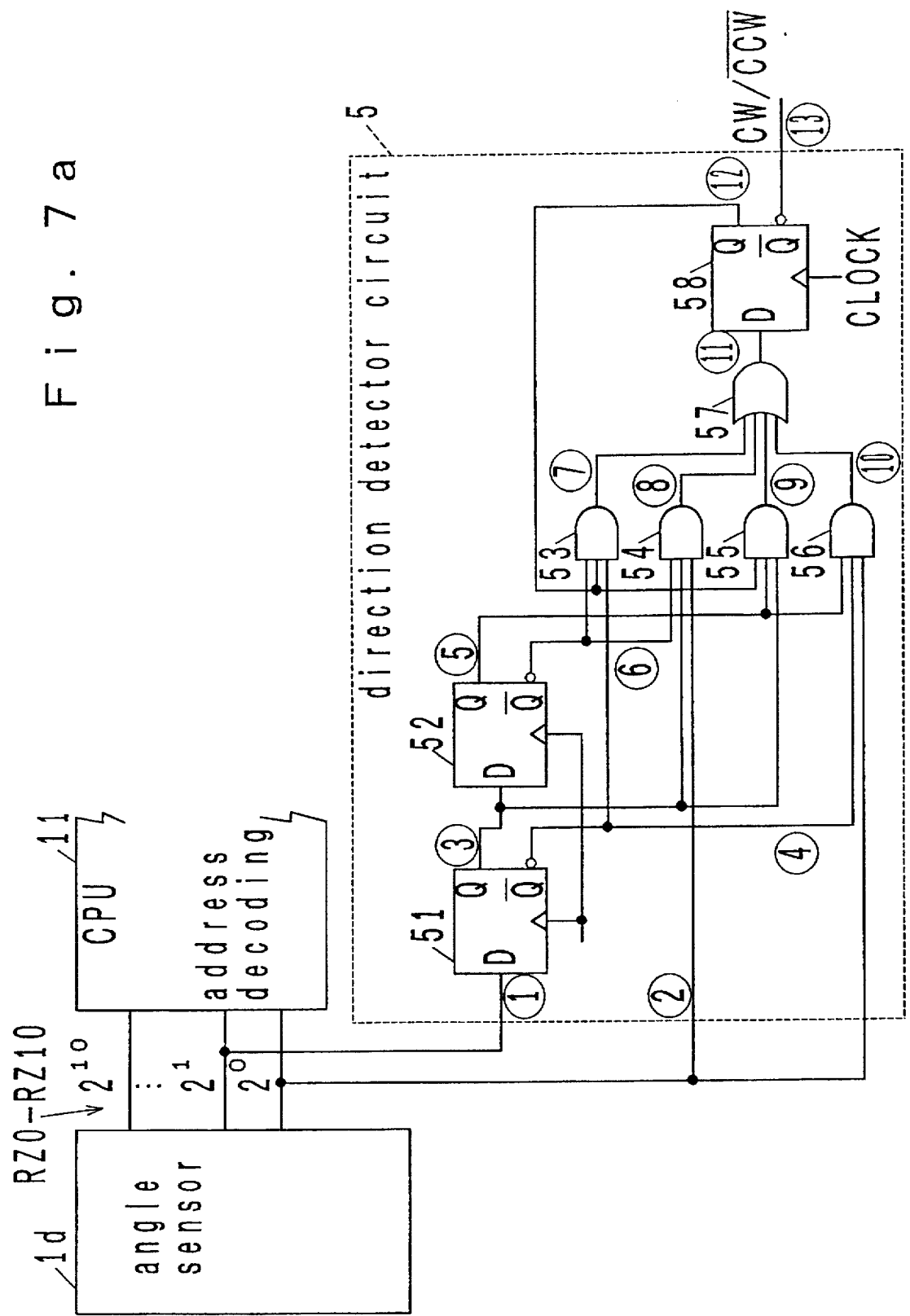
FIG. 7a is a block diagram of a direction detector circuit 5 shown in FIG. 1b.

Accordingly, in the present embodiment, a reverse rotation which occurs during the time the rotor is being driven for rotation is detected, and an oscillation compensation value is produced (FIG. 15) which acts to suppress such reverse rotation and is fed to the summer 16 to provide a compensation of the resulting current value. A control (FIG. 15) which produces such oscillation compensation value is also separate from the generation of the current waveform, thus assuring a tracking capability with respect to a rapid change (oscillation). Specifically, the direction detector circuit 5 shown in FIG. 7a is used to detect either rotational direction CW/CCW (clockwise/counter-clockwise) of the rotor of the SR motor 1, based on the least significant two bits of a signal delivered from the angle sensor 1d. Referring to FIG. 7a, the direction detector circuit 5 comprises D-type flip-flops 51, 52 and 58, and gate circuits 53, 54, 55, 56 and 57. The waveforms of various signals appearing in the direction detector circuit 5 are shown in FIGS. 7b and 8. CLOCK is applied to each of the flip-flops 51, 52 and 58. A signal ① corresponds to the second least significant bit 2×1 of 11 bits, detected angle data delivered from the angle sensor 1d, and a signal ② corresponds to the least significant bit 2×0. The signal ② changes from a low level to a high level or conversely for each rotation of the rotor through 0.35°. The signal ① is switched between a high and a low level in synchronism with the signal ② for each rotation of the rotor through 0.7°. The phase of the signal ② relative to the signal ① differs by 180° in electrical angle of the signal ② between the clockwise and counter-clockwise rotation of the rotor. The direction detector circuit 5 determines if the phase of the signal ② relative to the signal ① represents either CW or CCW. A lag involved with the determination is less than one-half period (0.35°) of the signal ②, and thus the direction detector circuit 5 detects the rotational direction of the rotor during the rotation thereof through an angle on the order of 0.35°.

Figure 14:
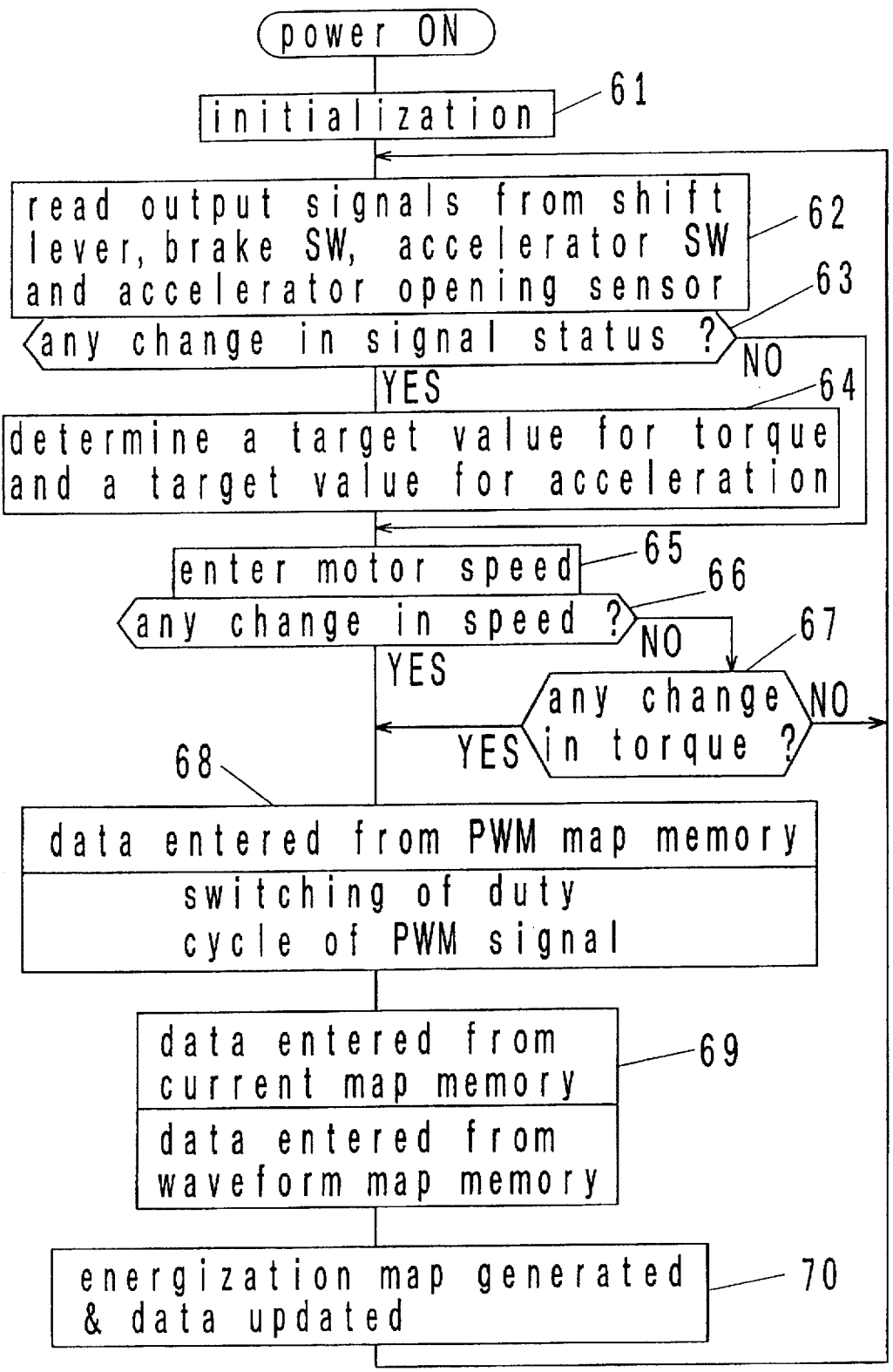
FIG. 14 is a flow chart of a motor drive control performed by CPU 11 shown in FIG. 1b.

A control operation performed by CPU 11 shown in FIGS. 1a and 1b is schematically indicated in FIG. 14. When the power is turned on, CPU 11 executes an initialization at step 61. Thus, internal memories within CPU 11 are initialized, internal timers and an interrupt mode are set up, followed by a system diagnosis. If no abnormality is found, the operation proceeds to the next step.

At step 62, the status of signals delivered from the shift lever, brake switch, accelerator switch and accelerator opening sensor are read. If there is any change in the status detected at step 62, the operation proceeds to step 64. Otherwise, the operation proceeds to step 65.

At step 64, a target value of the driving torque namely a target torque and a target value of the acceleration namely a target acceleration for the SR motor 1 are determined on the basis of various status detected at step 62. For example, when the accelerator opening sensor has detected an increased accelerator opening, a target value of the driving torque and a target value of the acceleration are also increased. Here, a torque change flag, indicating that there has been a change in the target torque, is set.

At step 65, the detected or current rotational speed of the SR motor 1 is fed as an input. It is to be noted that the rotational speed is detected by an interrupt operation to be described later. When there is a change in the rotational speed of the SR motor 1, the operational proceeds from step 66 to step 68. On the other hand, if there is no change in the rotational speed, the operation proceeds to step 67 where the status of the torque change flag is examined, and when it is set, indicating that there has been a change in the target torque, the operation proceeds to step 68. When there is no change in the torque, the operation returns to step 62.

At step 68, PWM map memory 13b is accessed to read data therefrom, and the duty cycle of the pulse signal(PWM signal) S10 is changed in accordance with the data read. The pulse signal S10 is normally delivered during the time the motor 1 is being driven, and has a fixed period corresponding to 15 kHz, but the duty cycle of the pulse signal is changed under the prevailing condition. Thus, the PWM map memory 13b is a read-only memory having a variety of data stored therein. Several groups of data stored in the memory 13b is shown in Table 1 below.

Figure 13:
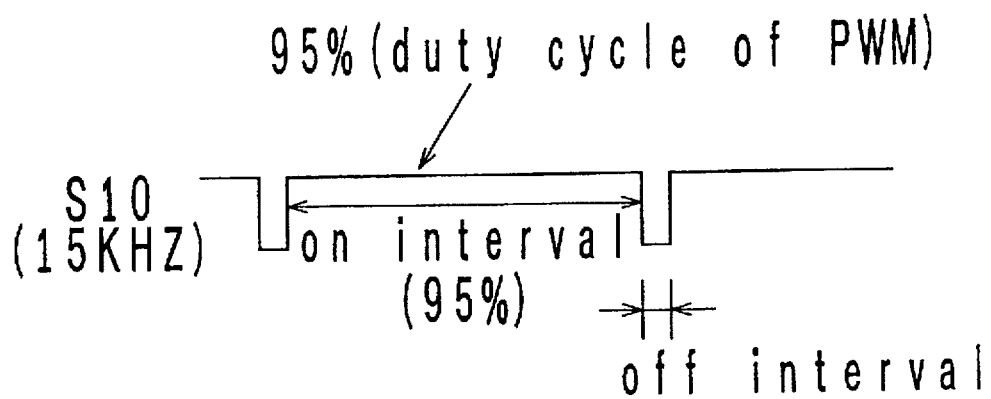

Memory 13b (Table 1) contains a multiplicity of data items Pnm, where n represents a column number corresponding to the torque, and m represents a row number corresponding to the number of revolutions. By way of example, data item P34 contains a figure indicating an on duty cycle of 95%. Accordingly, if the torque is 20 N·m and the number of revolutions is 500 rpm, CPU 11 refers to the data item P34, and updates the duty cycle so that the on interval of the signal S10 is equal to 95%. This produces a pulse waveform as shown in FIG. 13 for the signal S10.

TABLE 1

| PWM map | | ... | torque (N · m) | | | | | ... |
|---|---|---|---|---|---|---|---|---|
| | | | 10 | 15 | 20 | 25 | 30 | |
| number of revolutions (rpm) | | . | . | . | . | . | . | . |
| | 200 | . | P11 | P21 | P31 | P41 | P51 | . |
| | 300 | . | P12 | P22 | P32 | P42 | P52 | . |
| | 400 | . | P13 | P23 | P33 | P43 | P53 | . |
| | 500 | . | P14 | P24 | P34 | P44 | P54 | . |
| | . | . | . | . | . | . | . | . |
| | . | . | . | . | . | . | . | . |

Returning to FIG. 14, at step 69, data is read from the current map memory 13a and the waveform map memory 13c. In this embodiment, both the current map memory 13a and the waveform map memory 13c are read-only memories having a variety of data stored therein. Several groups of data contained in the current map memory 13a is indicated in the Table 2 below, and the several groups of data contained in the waveform map memory 13c is indicated in the Table 3 below.

TABLE 2

| current map | | ... | torque (N · m) | | | | | ... |
|---|---|---|---|---|---|---|---|---|
| | | | 10 | 15 | 20 | 25 | 30 | 35 | |
| number of revolutions (rpm) | | . | . | . | . | . | . | . | . |
| | 200 | . | C11 | C21 | C31 | C41 | C51 | C61 | . |
| | 300 | . | C12 | C22 | C32 | C42 | C52 | C62 | . |
| | 400 | . | C13 | C23 | C33 | C43 | C53 | C63 | . |
| | 500 | . | C14 | C24 | C34 | C44 | C54 | C64 | . |
| | 600 | . | C15 | C25 | C35 | C45 | C55 | C65 | . |
| | 700 | . | C16 | C26 | C36 | C46 | C56 | C66 | . |
| | . | . | . | . | . | . | . | . | . |
| | . | . | . | . | . | . | . | . | . |

The current map memory 13a (Table 2) contains a multiplicity of data items Cnm, where n represents a column number corresponding to the number of revolutions. One data item Cnm contains an energization ON angle, an energization OFF angle, a current upper limit and a waveform pattern number. For example, data item C34 for a torque of 20 N·m and a number of revolutions of 500 rpm contains 25°, 35°, 200 [A] and a waveform pattern No. 1. This data item C34 indicates energization information in a range of rotational positions from 0° to 45°. Specifically, as shown in FIG. 22, in a range from 25° to 35°, a current of a predetermined waveform pattern No. 3 and having an upper limit of current of 200 A is passed while the current supply is interrupted in a range from 0° to 25° and from 35° to 45°. At step 69, one data item Cnm which is selected in accordance with the prevailing torque and the number of revolutions is read.

TABLE 3

| waveform map | | waveform pattern | | | |
|---|---|---|---|---|---|
| | | pattern No. 1 | pattern No. 2 | pattern No. 3 | ... |
| rotor angle step No. | 0 | 255 | 0 | 0 | |
| | 1 | 255 | 12 | 12 | |
| | 2 | 255 | 26 | 26 | |
| | 3 | 255 | 40 | 40 | ... |
| | . | . | . | . | ... |
| | . | . | . | . | |
| | 86 | 255 | 255 | 15 | |
| | 87 | 255 | 255 | 8 | |
| | 88 | 255 | 255 | 3 | |
| | 89 | 255 | 255 | 255 | |

Figure 21A:
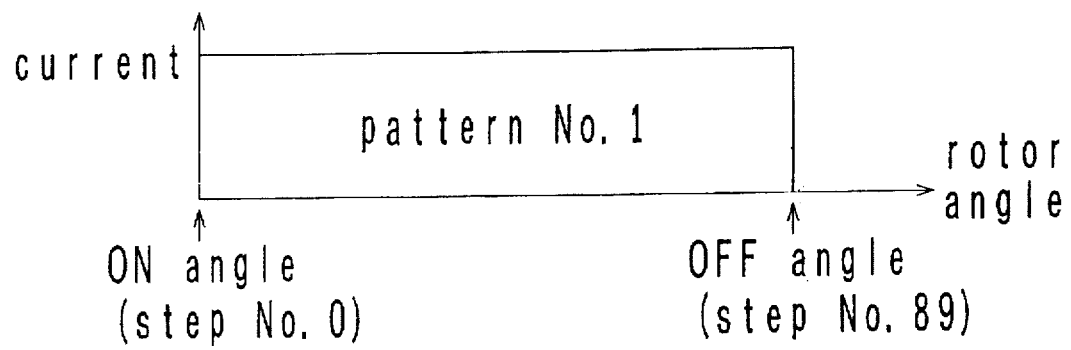
Figure 21B:
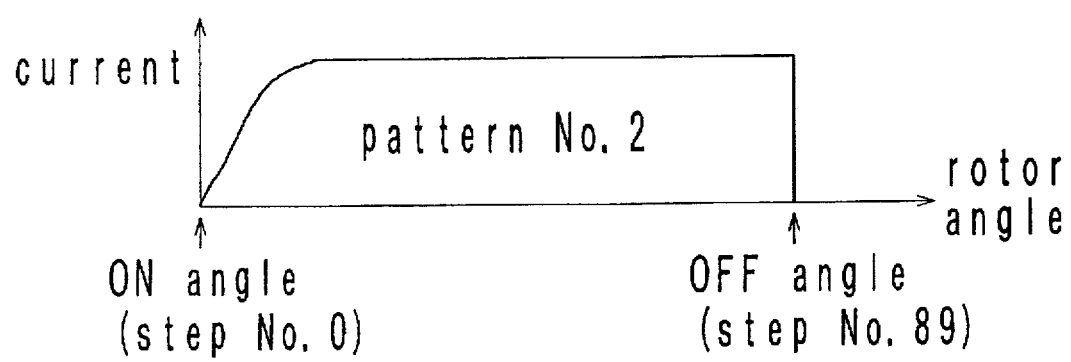
FIG. 21b graphically shows a current waveform formed according to data of the map memory 13c of pattern No. 2.
Figure 21C:
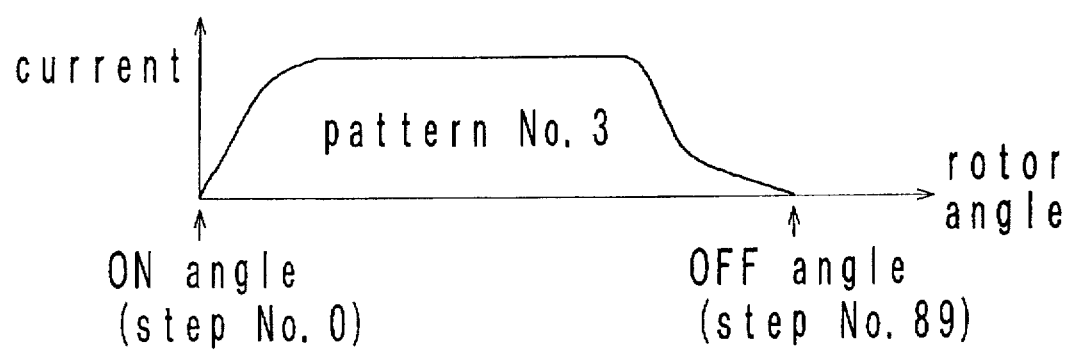
FIG. 21c graphically shows a current waveform formed by data of the map memory 13c of pattern No. 3.

One set of waveform data corresponding to the number of the waveform pattern contained in the data item Cnm is read from the waveform map memory 13c (Table 3). By way of example, when the number of the waveform pattern is 3, a series of waveform data including 0, 12, 26, 40, - - - under the column of waveform pattern No. 3 in the Table 3 are entered. A waveform for the current reference value which is actually passed through the coil in accordance with such waveform data is determined as indicated in FIGS. 21a to 21c. When the number of the waveform pattern is 1, a waveform as shown in FIG. 21a is used. For a waveform pattern No. 2, a waveform as shown in FIG. 21b results. In this manner, a fine adjustment of the current reference value takes place for each angular step of rotor of the motor.

At step 70, data for an energization pattern is produced on the basis of data item Cnm and waveform data which are entered at step 69. Specifically, a multiplicity of current reference values and associated data (to be described in detail later) corresponding to each angular step of the rotor of the motor are produced. The data for energization pattern is written into a memory (bidirectional RAM 49 shown in FIG. 4b) within the current waveform generating circuit 15. As will be described later, the circuit 25 automatically produces data for phase 1 to 3 on the basis of data for one phase which is chosen as a reference. Accordingly, at step 70, an energization pattern for a specific one phase is produced, and is written into the bidirectional RAM 49 within the circuit 15.

CPU 11 repeatedly executes the steps 62 to 70. When the rotational speed and the torque of the SR motor which are detected remain constant, the operation loops around the steps 66-67-62, but when there is a change in the rotational speed or the torque, the operation enters the execution of the steps 68-69-70, thus updating the energization pattern produced within the circuit 15.

As described, the current map memory 13a (Table 2) contains a multiplicity of data items Cnm. One data item Cnm contains an energization ON angle, an energization OFF angle, a current upper limit and a waveform pattern number. While the energization ON angle (start timing) is denoted as "ON angle" in FIG. 22 is constant and have no relationship with the target torque and the rotational speed of the motor, the energization OFF angle which is denoted as "OFF angle" in FIG. 22 is advanced from the standard energization OFF angle. The advance corresponds to the target torque and the rotational speed as shown in FIG. 19 for an example, wherein the advance value is denoted by "angle correction" (electrical angle) on an axis of ordinate.

Respective energization OFF angle which is assigned to a specific rotational speed and a specific target torque is calculated by subtracting from the standard energization OFF angle an advance value which corresponds to the specific rotational speed and the specific target torque, then the energization OFF angle is written into the current map memory 13a at an address designated by the specific rotational speed and the specific target torque.

Figure 19:
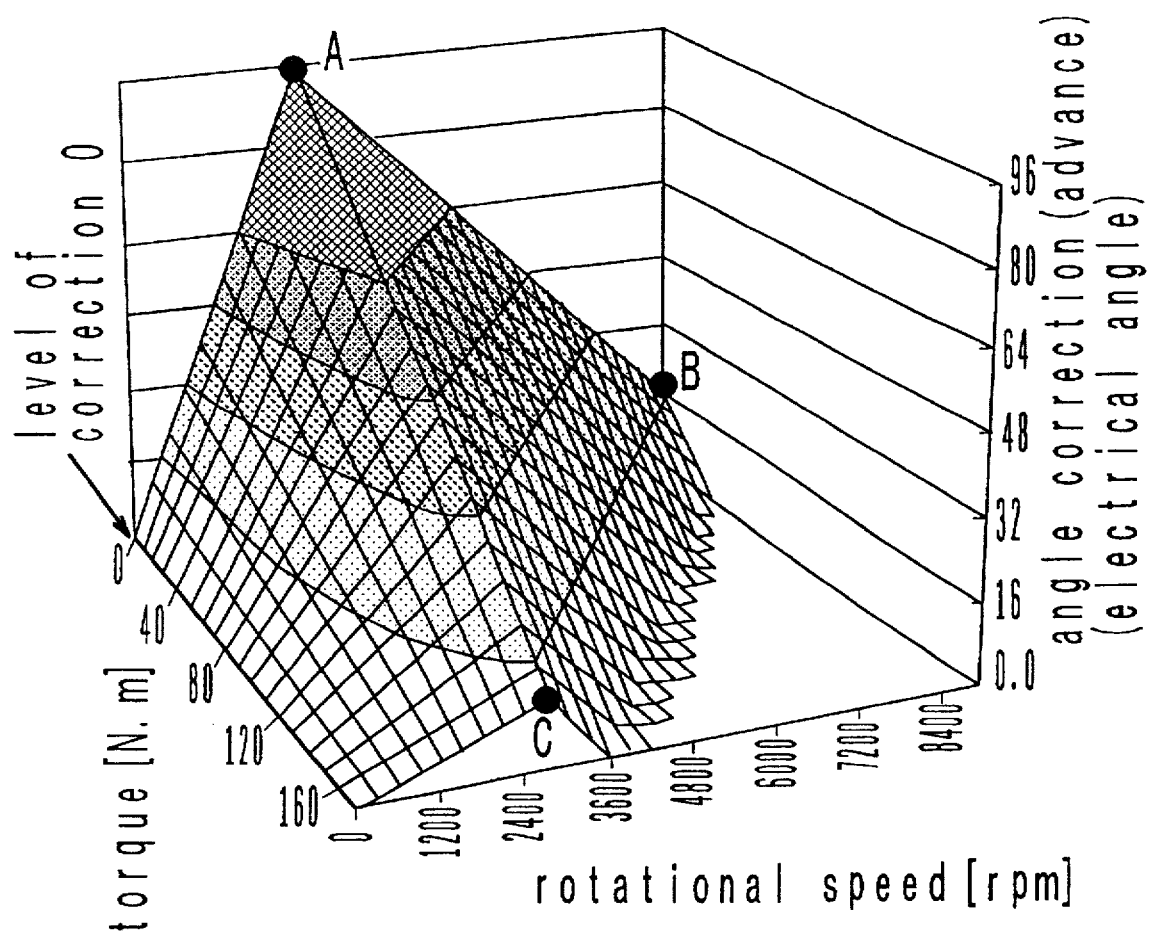
Figure 20:
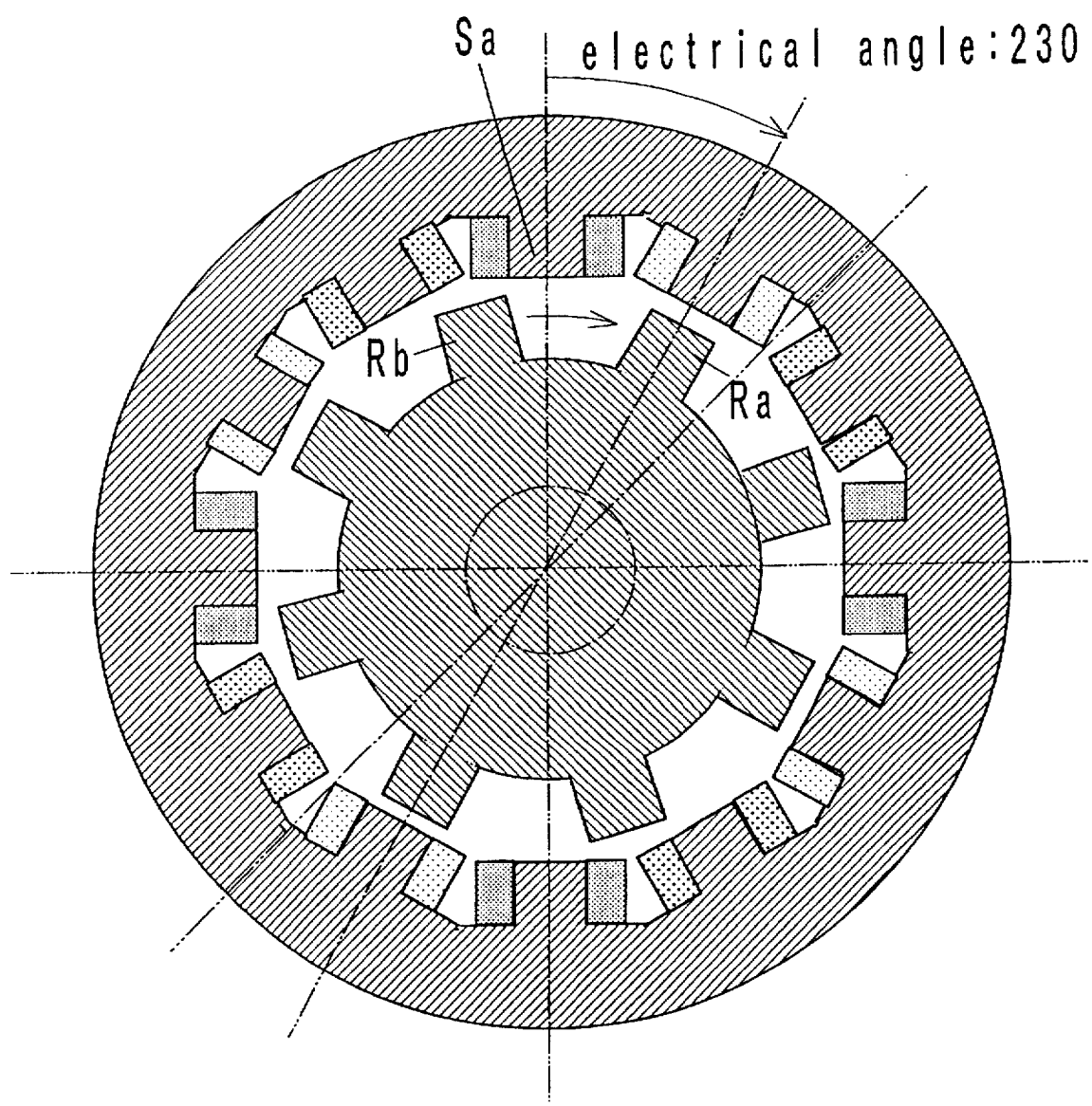
FIG. 20 is a section view showing a basic structure of an SR motor 1 shown in FIG. 1a, illustrating the motor at the start of energization of phase 1 coil.

A process for determining the advance value shown in FIG. 19 is now described. At first a range of the rotational speed in which an increment of the ripple of motor torque due to the advance of the energization OFF angle occurs is determined. A maximum rotational speed of the range is denoted as a threshold speed Rbase. Then a maximum A of allowable advance of the energization OFF angle at the threshold speed Rbase when the motor torque is minimum, a maximum B of allowable advance of the energization OFF angle at the highest speed Rmax when the motor torque is minimum and a maximum C of allowable advance of the energization OFF angle at the highest motor torque Tmax and the rotational speed Rt which is an upper threshold for obtaining the highest torque Tmax are determined. The maximum A to C are dotted on FIGS. 19 and 28 for an example.

A proportional constant Kr which determines an advance increment corresponding to an increment of the rotational speed is calculated as follows:

$$Kr=(A-C)/(Rmax-Rbase)$$

An advance value B' at the threshold speed Rbase and when the motor torque is the maximum Tmax is calculated as follows:

$$Kt=(A-B')/Tmax$$

Then a proportional constant Kt which determines an advance decrement corresponding to an increment of the target torque is calculated as follows:

$$Kt=(A-B'))/Tmax$$

Respective advance value (angle correction in FIG. 19) corresponding to respective target torque T (N·m) and rotational speed N (rpm) which exceeds the threshold speed Rbase is calculated by a following interpolation:

$$advance\ value=A-[(N-Rbase)\times Kr]-(T\times Kt)$$

In the speed range under or equal to the threshold speed Rbase, respective advance value is calculated by a following linear interpolation:

$$advance\ value=(A/Rbase)\times N)-(T\times Kt)$$

The angle correction (electrical angle) in FIG. 19 is the advance value calculated as described above. In this instance, the data mentioned above are as follows:

A=96° (electrical angle),
B=20° (electrical angle),
C=16° (electrical angle),
Rbase, Rt≈2600 (rpm),
Rmax=9000 (rpm), and
Tmax=165 (N·m)

As the advance value in the range of the rotational speed N exceeding the threshold speed Rbase is calculated by A−[(N−Rbase)×Kr]−(T×Kt), the advance value decreases responding to an increment of the speed N and also to an increment of the target torque T. Whereas the advance value in the range of the speed N is under or equal to the threshold speed Rbase, the advance value decreases responding to a decrement of the speed N and also to an increment of the target torque T by the calculation (A/Rbase)×N)−(T×Kt).

Accordingly the advance value is maximum A at the threshold speed Rbase. This prevents the generation of the high level of acoustic noises, specifically at around the threshold speed Rbase. If a high level of acoustic noises is generated at a rotational speed of 1000 [rpm] with the standard energization OFF angle, the generation of the acoustic noises is prevented by determining the threshold speed Rbase as 1000 [rpm]. However, while Rbase=1000 [rpm] is preferable for preventing the generation of the acoustic noises at 1000 [rpm], it is not critical. If the advance value calculated by A−[(N−Rbase)×Kr]−(T×Kt) at 1000 [rpm] is enough to prevent the generation of the noises, the threshold speed Rbase may be differed from 1000 [rpm].

The advance value around the threshold speed Rbase is high, which means that the energization interval of the coils is short and that the motor torque declines in proportion to the advance value. As shown by a chain curve in FIG. 28, the motor torque declines in accordance with an increment of the motor speed. The advance value declines in accordance with the increment of the motor speed. This declination of the advance value reduces an additional declination of the motor torque at a high speed range.

The advance value declines in accordance with the decrement of the motor speed at a low speed range. This prevents the torque ripple which may be generated by shortening the energization interval at the low speed range. In-addition, the upper limit value (the highest level of the current waveform as shown in FIGS. 21a to 21c) of the current is increased corresponding to the increment of the rotational speed at the low speed range for compensating a torque reduction due to the increment of the advance value.

For an example, a data item C35 in the current map memory 13a (Table 2) assigned to a rotational speed 6.00 |rpm| contains an upper current limit value which is higher than that contained in a data item C32 which is assigned to a lower rotational speed 300 |rpm|. The current waveform gene-rating circuit 15 limits the target current signal S4 to the summer 16 within the upper current limit value. Thus a higher level of current can be supplied at the rotational speed 600 |rpm| as compared with the speed 300 |rpm|.

Referring to FIG. 14 again, upon completion of initialization which takes place at step 61, a timer interrupt occurs within the CPU 11 every 4 msec. When a timer interrupt occurs, CPU 11 executes the operation in FIG. 15.

Figure 15:
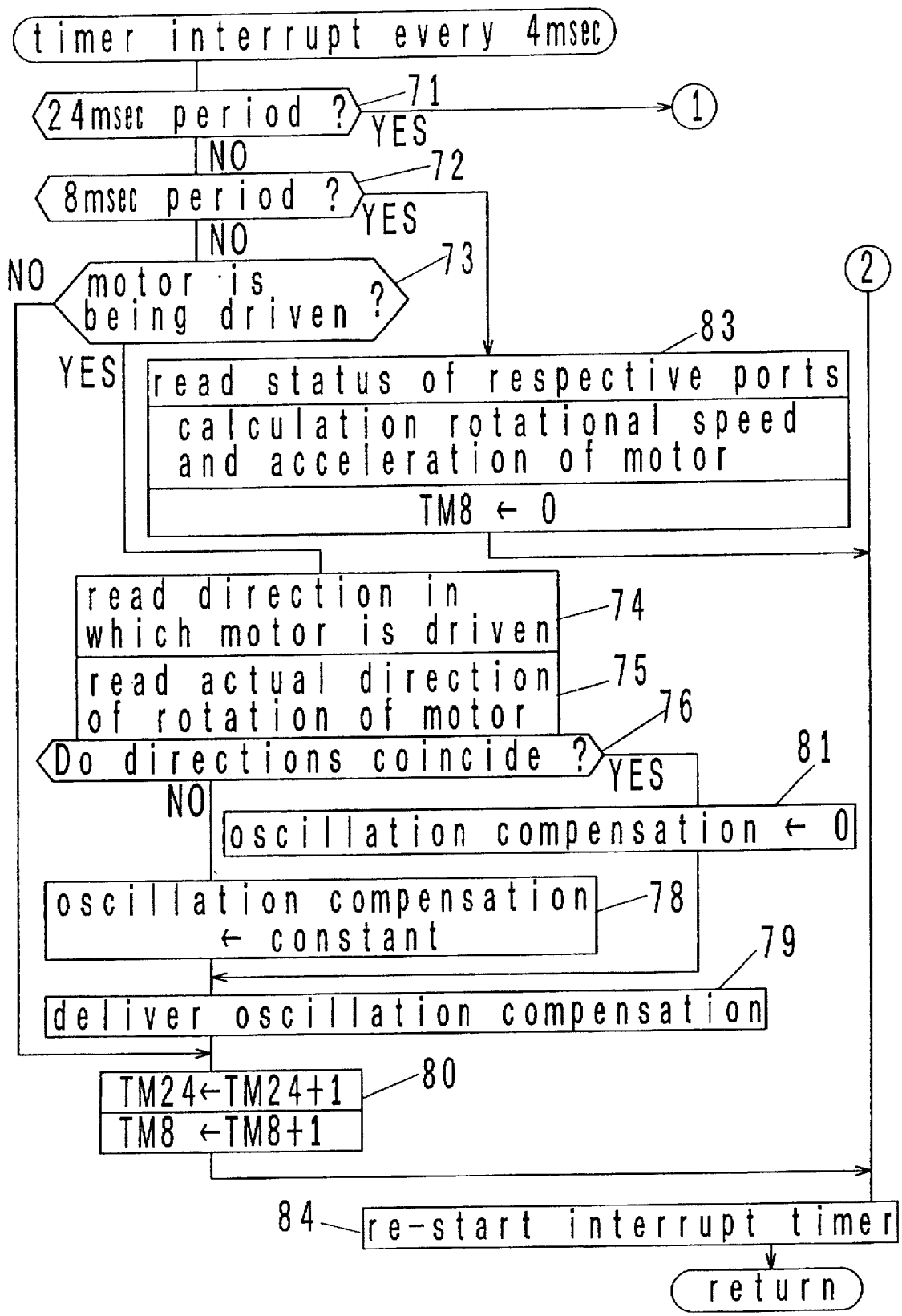
FIG. 15 is a first part of a flow chart of a timer interrupt operation performed by CPU 11 shown in FIG. 1b.

Referring to FIG. 15, at step 71, CPU 11 refers to a count in a counter TM24 to see if it occurred at a given timing, which is chosen to be a period of 24 msec. Thus, the operation proceeds from step 71 to step 91 (FIG. 16) at a rate of one run per 24 msec. If the period is not as chosen, the operation proceeds from step 71 to step 72. At step 72, a count in a counter TM8 is referred, examining if it occurred at a given timing, which is chosen to be a period of 8 msec. Thus, in this instance, the operation proceeds from step 72 to step 83 at a rate of one run every 8 msec, otherwise, the operation proceeds from step 72 to step 73.

At step 83 which is executed at a rate of one run every 8 msec, status of the shift lever, brake switch, accelerator switch and accelerator opening sensor are read through the input interface 12 (FIG. 1b), and the results stored in an internal memory. The rotational speed of the motor is also calculated. In the present embodiment, the angle sensor 1d connected to the drive shaft of the SR motor 1 delivers a pulse signal having a period which varies with the rotational speed of the drive shaft. Accordingly, CPU 11 determines a period with which detected angle data RZ0 to RZ10 delivered from the angle sensor 1d changes, and based on this period, calculates the rotational speed of the SR motor 1. Then CPU 11 calculate the acceleration of the motor with the rotational speed calculated now and a precedent speed which was calculated in the past by a cycle (8 msec). Data representing the rotational speed and the acceleration are stored in an internal memory. The counter TM8 is cleared at step 83.

At step 73, it is examined if the SR motor 1 is being driven. If the motor is being driven, the operation proceeds to step 74, and otherwise the operation proceeds to step 80. At step 74, it is examined if the current rotational direction (the direction in which the rotor is to be driven) is CW or CCW. At next step 75, it is examined if a direction detection signal (13) from the direction detector circuit 5, or current actual rotational direction of the rotor, is either CW or CCW.

At step 76, an examination is made to see if the rotational direction in which the rotor is to be driven as determined at step 74 coincides with the actual rotational direction as determined at step 75. If they match, the operation proceeds to step 81, setting an oscillation compensation value CP1 to 0. If a mismatch is found, indicating that a reverse rotation of the rotor is occurring as a result of oscillation, the operation proceeds to step 78 where a predetermined constant is chosen for the oscillation value CP1. In this embodiment, the constant (current value) chosen for the oscillation compensation value CP1 at step 78 is selected as +30 [A]. At next step 79, the oscillation compensation value CP1 which is determined at either step 78 or 81 is delivered, and is applied to the summer 16 (FIG. 2). It is to be noted that this oscillation compensation value CP1 is used in common for the control systems of the three phases.

At step 80, the counters TM24 and TM8 are increased by one. At step 84, the interrupt timer is re-started in order to enable a next run of interrupt operation.

Figure 16:
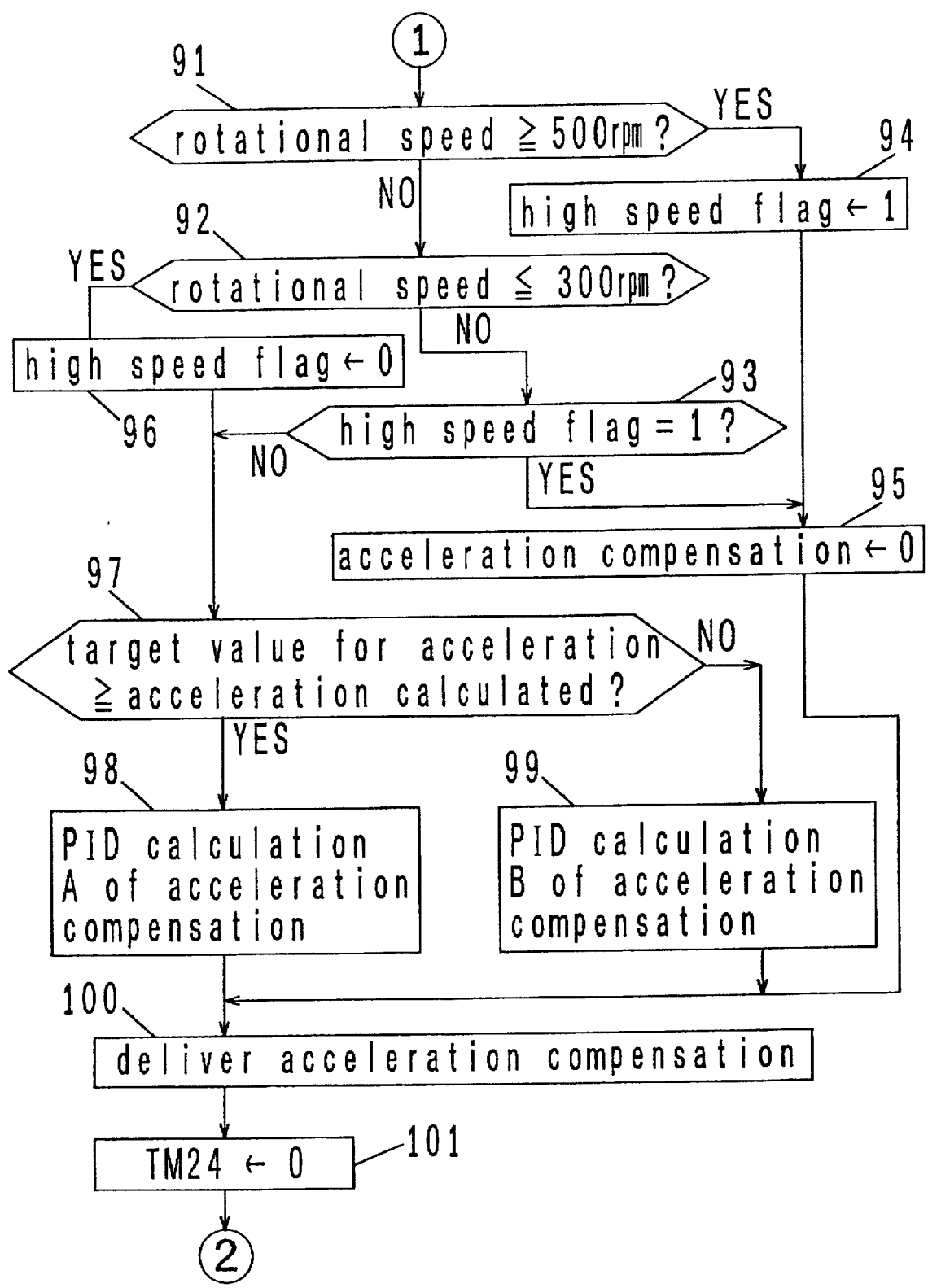
FIG. 16 is a second part of a flow chart of a.timer interrupt operation performed by CPU 11 shown in FIG. 1b.

Referring to FIG. 16 which shows steps 91 to 101 which are executed at a rate of one run every 24 msec, the speed calculated at step 83 is compared with a first threshold 500 |rpm| at step 91. If the speed is equal to or exceeds the first threshold, the operation proceeds from step 91 to step 94, otherwise, the operation proceeds from step 91 to step 92. At step 94, data "1" is assigned to a high speed flag, then the operation proceeds to step 95.

At step 92, the speed calculated at step 83 is compared with a second threshold 300 |rpm|. If the speed is equal to or less than the second threshold, the operation proceeds from step 92 to step 96, otherwise, the operation proceeds from step 92 to step 93. At step 96, the data in the high speed flag is cleared, then the operation proceeds to step 97. At step 93, the data in the high speed flag is referred, examining if it is "1". If it is affirmative, the operation proceeds from step 93 to step 95. If the data in the high speed flag is "0" the operation proceeds from step 93 to step 97.

At step 95, an acceleration compensation which is assigned to supply to the adder 16b in the summer 16 is cleared (determined to zero). Then the operation proceeds to step 100.

Figure 25A:
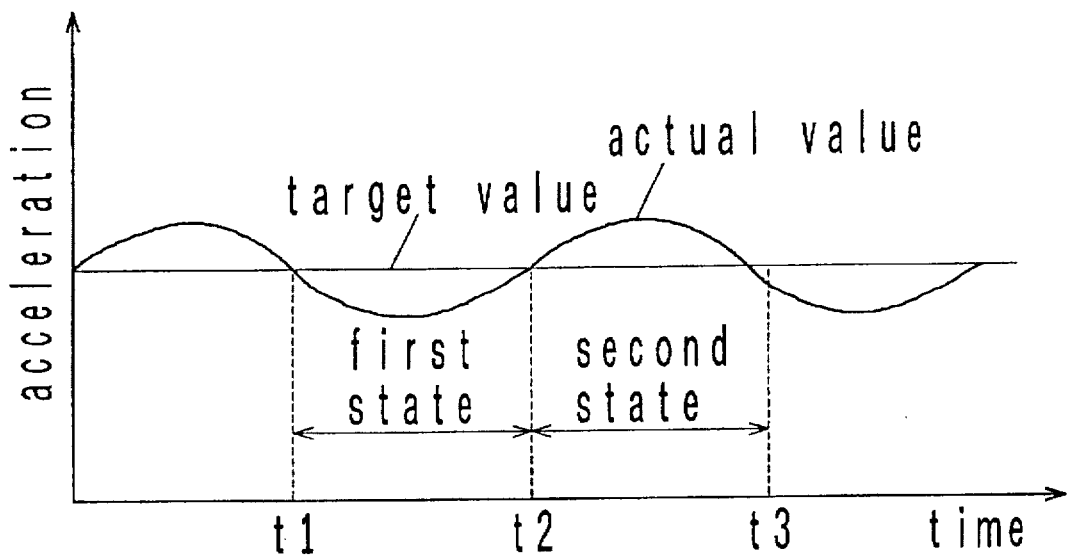

At step 97, the acceleration of the motor (actual acceleration) calculated at step 83 is compared with the target acceleration determined at step 64. Then the operation proceeds to step 98 when the actual acceleration is under or equal to the target acceleration as shown as "first state" in FIG. 25a. If the actual acceleration exceeds the target acceleration as shown as "second state" in FIG. 25a, the operation proceeds to step 99. The constant target acceleration as shown in FIG. 25a indicates a constant acceleration of the rotational speed as shown by an inclined line in FIG. 25b.

At step 98, a given PID (proportion/integral/differential) calculation A is executed for obtaining an acceleration compensation which is assigned to supply to the adder 16b in the summer 16. At first in the calculation A, a deviation Ea of the actual acceleration Ad calculated at step 83 from the target acceleration Aref determined at step 64 is calculated. Thereafter calculating a differential dE and an integral IE of the deviation Ea, an acceleration compensation CP2 is calculated by a following equation (1).

At step 99, a given PID calculation B is executed, which is similar to the calculation A at step 98 but an acceleration compensation CP2 is calculated by a following equation (2).

$$CP2 = Kp1 \cdot Ea + Kd1 \cdot dE + Ki1 \cdot IE \qquad (1)$$

Kp1, Kd1, Ki1:constant $$CP2 = Kp2 \cdot Ea + Kd2 \cdot dE + Ki2 \cdot IE \qquad (2)$$

Kp2, Kd2, Ki2:constant
Kp1>Kp2, Kd1>Kd2, Ki1>Ki2

Figure 26A:
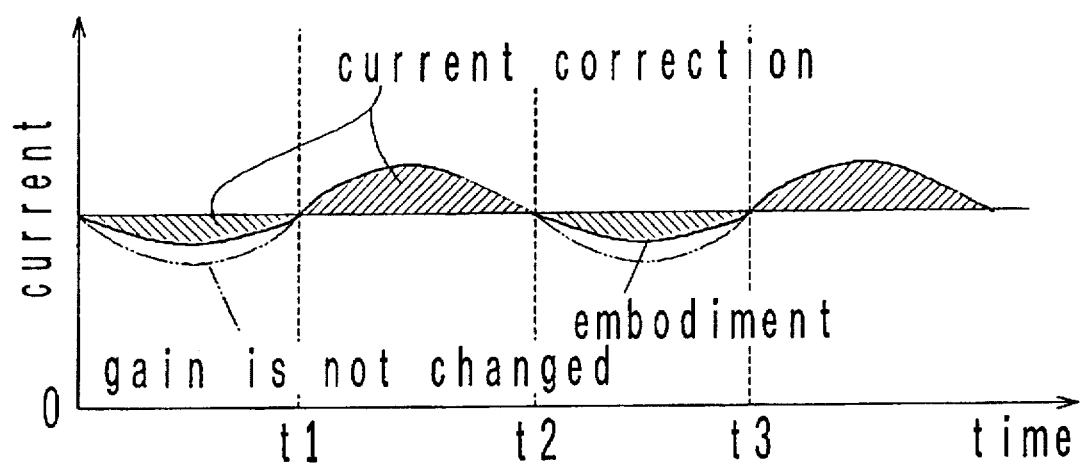
Figure 26B:
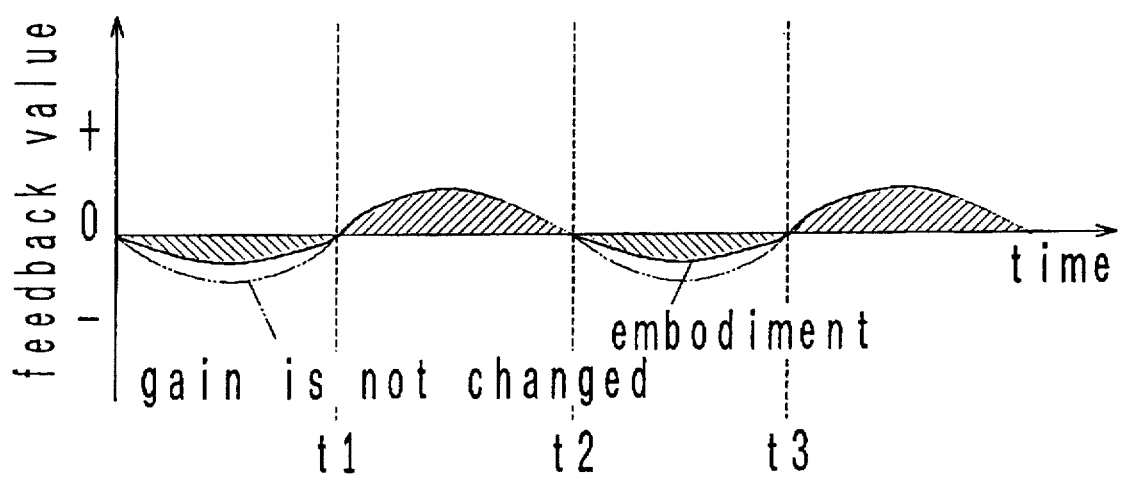

The selection of the equation (1) or (2) is a selection or alteration of the gains Kp1/Kp2, Kd1/Kd2 and Ki1/Ki2. Even if the deviation Ea is the same, the acceleration compensation CP2 (absolute value) calculated at step 98 with the equation (1) is higher than that calculated at step 99 with the equation (2). Thus the acceleration compensation CP2 which is a feedback value for an acceleration control of the SR motor at the "first state" in FIG. 25a is higher than that at the "second state" in FIG. 25a. This difference is shown in FIG. 26b. The current level represented by the signal S4b at the output of summer 16 in FIG. 2 alters as shown in FIG. 26a.

Figure 25B:
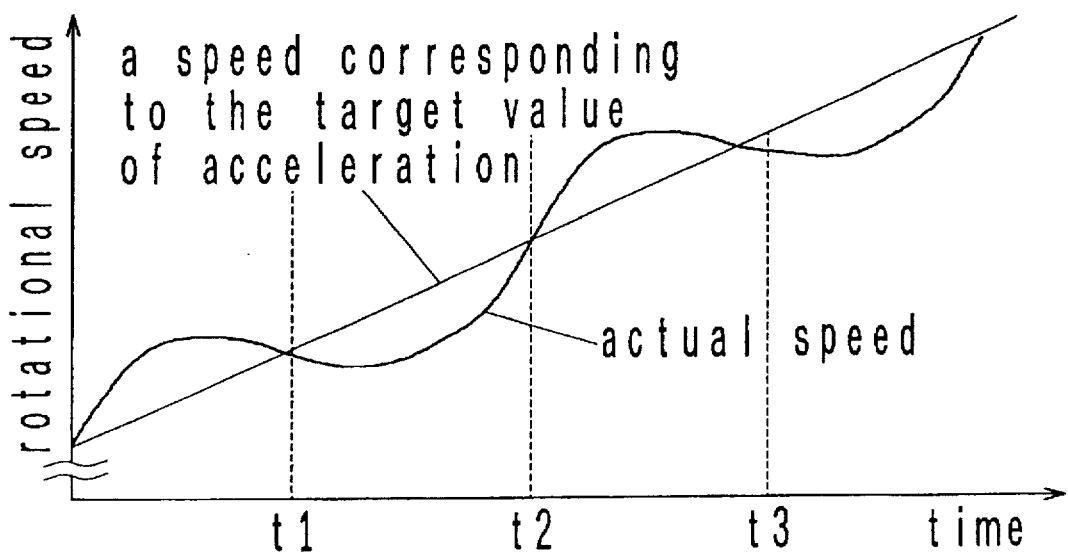

Accordingly, if the actual acceleration is under or equal to the target acceleration ("first state"), the compensation of the current at the summer 16 is intensified to compensate an insufficient motor torque for accommodating the actual acceleration to the target acceleration. If the actual acceleration exceeds the target acceleration ("second state"), the compensation of the current at the summer 16 is attenuated. Thus the accommodation of the actual acceleration to the target acceleration may be delayed. However the delay does not retard the acceleration of the rotational speed as shown in FIG. 25b. On the contrary, the delay attributes to the acceleration of the rotational speed because the actual acceleration exceeds the target acceleration at the "second state". A level of noises generated by a tangential oscillation of the rotor depends on a level of an amplitude of an oscillation of the deviation of the actual acceleration from the target acceleration. The deviation is much reduced at the "first state" and relatively reduced at the "second state" by the acceleration feedback control as described above. Thus a mean level of the amplitude of the oscillation of the deviation is low enough to prevent the generation of the noises.

At step 100, the acceleration compensation determined in step 95, 98 or 99 is supplied to summer 16 (FIG. 2). Then the counter TM24 is cleared at step 101.

As described, the acceleration compensation is cleared at step 95 for nullifying aforesaid acceleration feedback control if the rotational speed is over or equal with 500 [rpm], or if the speed exceeds 300 [rpm] and the high speed flag is "1". In another words, the acceleration feedback control is effective when the rotational speed is under or equal with 300 [rpm], or the high speed flag is "0" and the rotational speed is under 500 [rpm]. The high speed flag "1" is set when the rotational speed rise up to 500 [rpm] and is maintained until the rotational speed falls down to 300 [rpm]. Thus there is a hysteresis on the alternation of the data of the high speed flag with respect to up and down of the rotational speed. The PID calculation A or B is not executed in case when the the high speed flag is "1" (which means that the speed is high).

The PID calculation is time consuming. While CPU 11 must determine a target current by a small angle of rotation of the rotor. A pitch (cycle) of the determination becomes short corresponding to a speed up of the rotation. Then CPU 11 can not share a time to the PID calculation. A main purpose of the acceleration compensation by the feedback control including the PID calculation is to prevent a generation of noises. The noises is generated exclusively at a relatively low speed range. Accordingly, the feedback control for the acceleration compensation may be eliminated at a higher speed range. By eliminating the acceleration compensation as described (steps 91 to 95, and 100 in FIG. 16), CPU 11 can share enough time to the determination of the target current by the small angle of rotation of the rotor.

Figure 9:
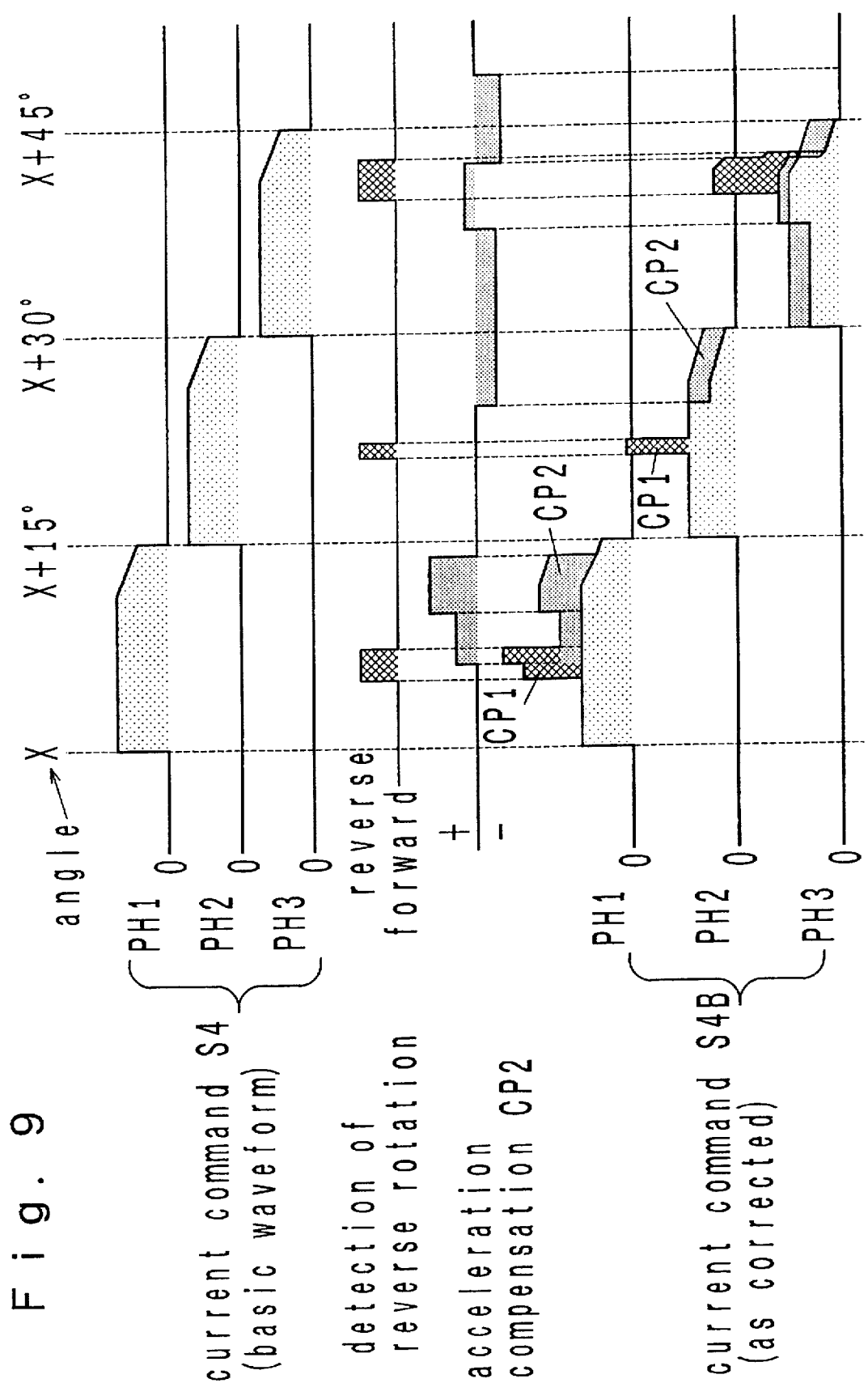
FIG. 9 is a series of timing charts indicating changes occurring in an input signal S4 and an output signal S4B of the summer 16 shown in FIG. 1b.

A current waveform which results from the current command value S4 delivered from the current waveform generating circuit 15 and the current command value S4B as corrected by the summer 16 is shown in FIG. 9 where CP1 represents an oscillation compensation value and CP2 a speed compensation value. It is to be noted that the oscillation compensation value CP1 and the speed compensation value CP2 are used in common for the three phases. When the current command value S4 is equal to 0, the corrected current command value S4B is also made equal to 0. By summing the oscillation compensation value CP1 to the current command value S4, the oscillation of the SR motor 1 is suppressed, thus reducing the acoustic noises. By summing the acceleration compensation value CP2 to the current command value S4, the response in controlling the acceleration of the SR motor 1 is improved.

Since a three phase SR motor 1 is driven in the present embodiment, it is necessary to produce current command values which are to be passed through the respective phase coils for three phases. In the embodiment, it is intended that the energization waveform be optimized for adjusting the current command value for each rotation of the rotor through a minute angle (0.35° or one step), and accordingly it is very difficult to produce a current command value S4. In addition, since the current command value must be changed for each rotation of the rotor through one step, the updating of the current command value S4 must be capable of being executed momentarily. To produce a signal in this manner, a multiplicity of current command values may be previously stored in the current map memory 13a and an address of the memory 13a may be associated with the angle of rotation of the rotor so that for each change of the angle of rotation of the rotor, angle data may be applied to the memory 13a at the corresponding address so as to read a current command value corresponding to this angle from the memory 13a for application to the summer 16. A triple set of such control circuits may be provided to produce the current command values for three phases.

However, it will be seen that if a triple set of independent current waveform generating circuits are provided for the three phases, a resulting memory capacity required will be voluminous and the complication of the circuit arrangement is unavoidable. In addition, since CPU 11 must rewrite the energization map for any change in the number of revolutions or the required torque of the motor, an updating of all the content of a memory having a voluminous capacity will be very time consuming, thus degrading the response of the control system.

Figure 27:
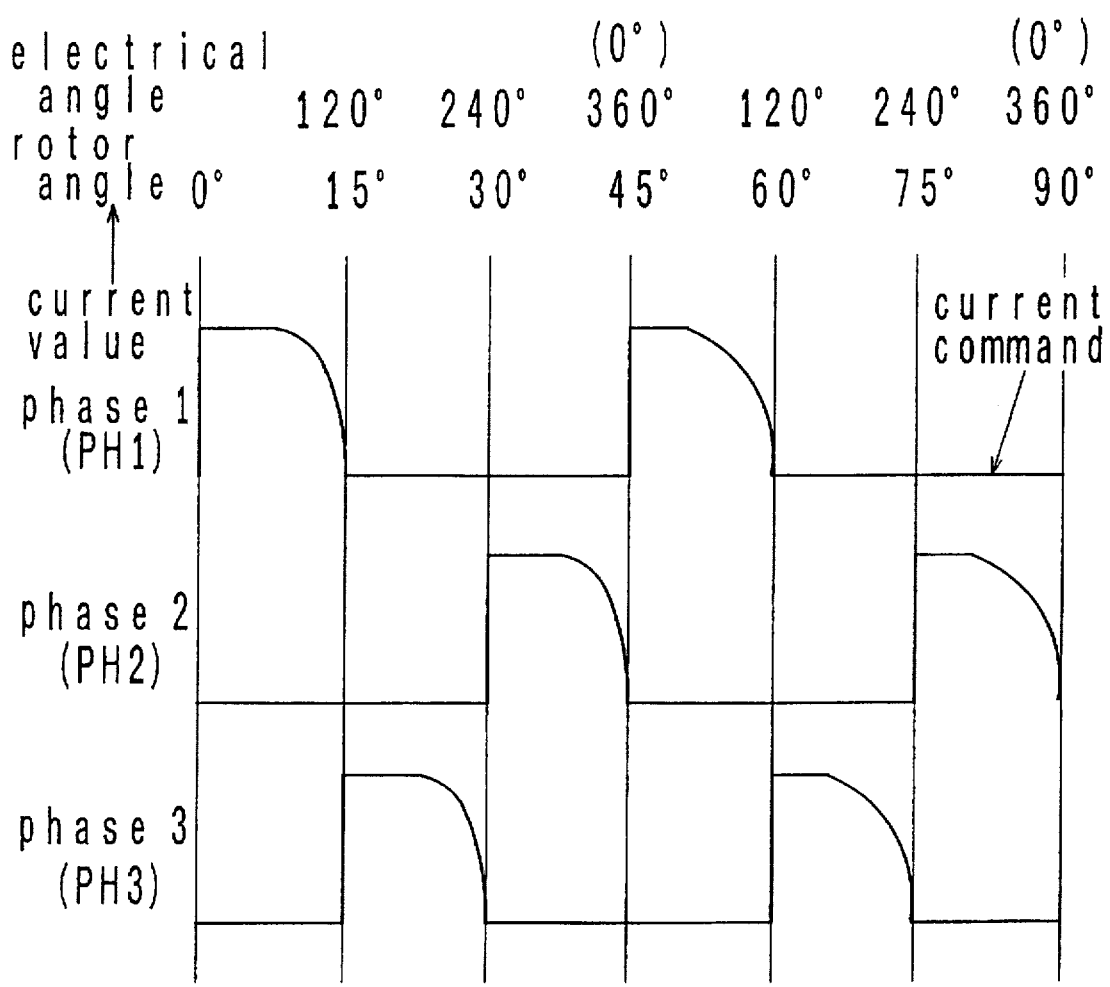

However, as will be noted from FIGS. 9 and 27, the waveform of the current command values for the three phases are analogous to each other, only differing in the phase or relative angle of the waveform. Accordingly, using the waveform of current command value for one phase which is chosen as a reference, it is possible to produce current command values for the three phases by phase displacing the reference waveform.

Figure 5B:
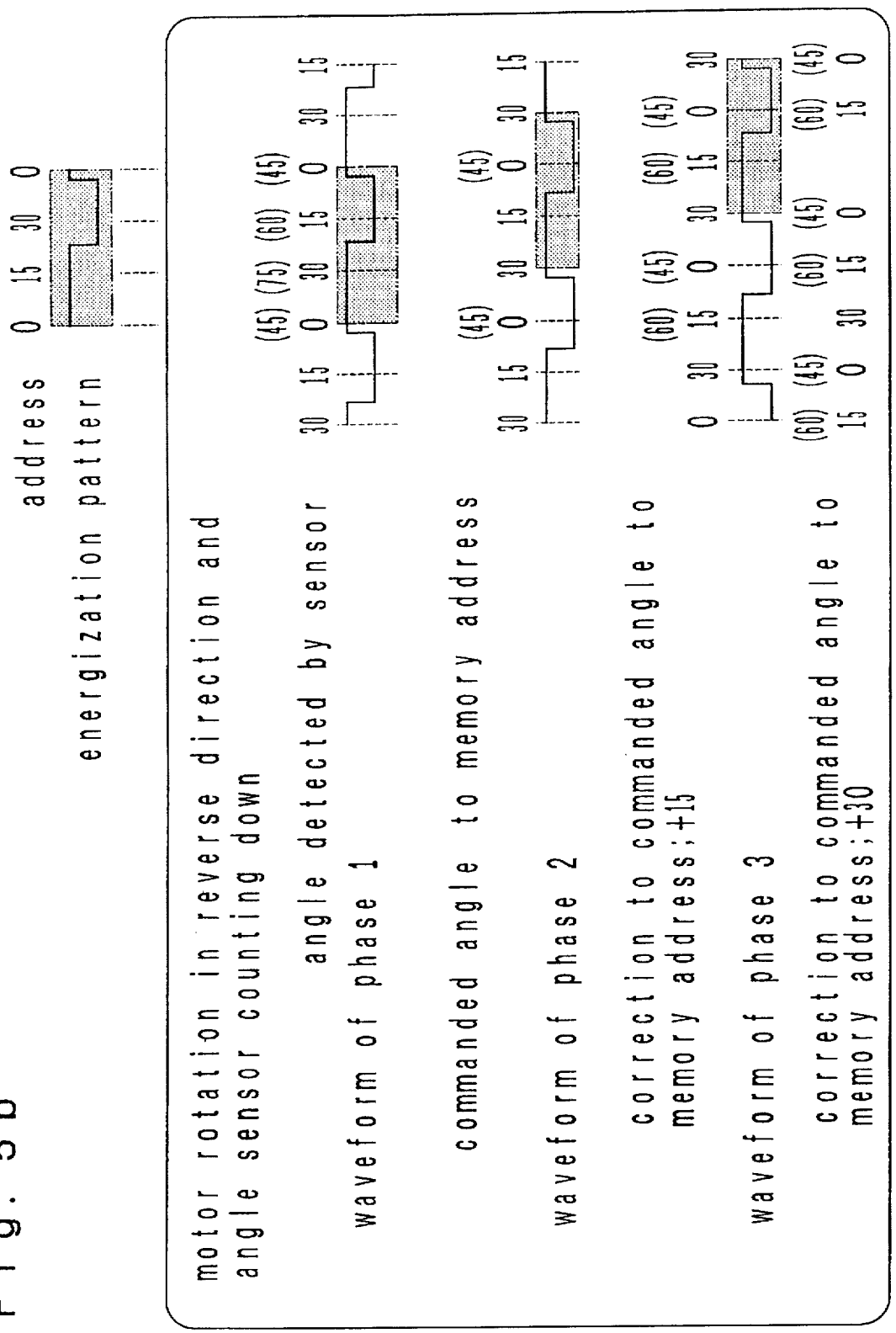
FIG. 5b is a series of timing charts of a signal generated by the circuit 15, and output currents delivered from the drivers 18 to 20 shown in FIG. 1a based on the signal from the circuit 15, to the electrical coils of the motor when it is driven for rotation in the reverse direction, the charts indicating an approximate change in the current level.

As an example, FIGS. 5a and 5b illustrate that when a multiplicity of waveform data (energization pattern shown as hatched) associated with each angular step within the range from 0° to 90° of the phase 1 is stored in a memory, it is possible to derive waveform data for phase 2 by adding +120° to the indicated angle used as a memory address, and to derive waveform data for phase 3 by adding +240° to the indicated angle used as a memory address. Thus, by storing a group of waveform data (energization pattern) for one phase which is chosen as a reference in a memory, signal waveforms for all the three phases can be derived therefrom. This reduces the required memory capacity, simplifies the circuit arrangement and also reduces the time required to update the memory content.

Figure 6:
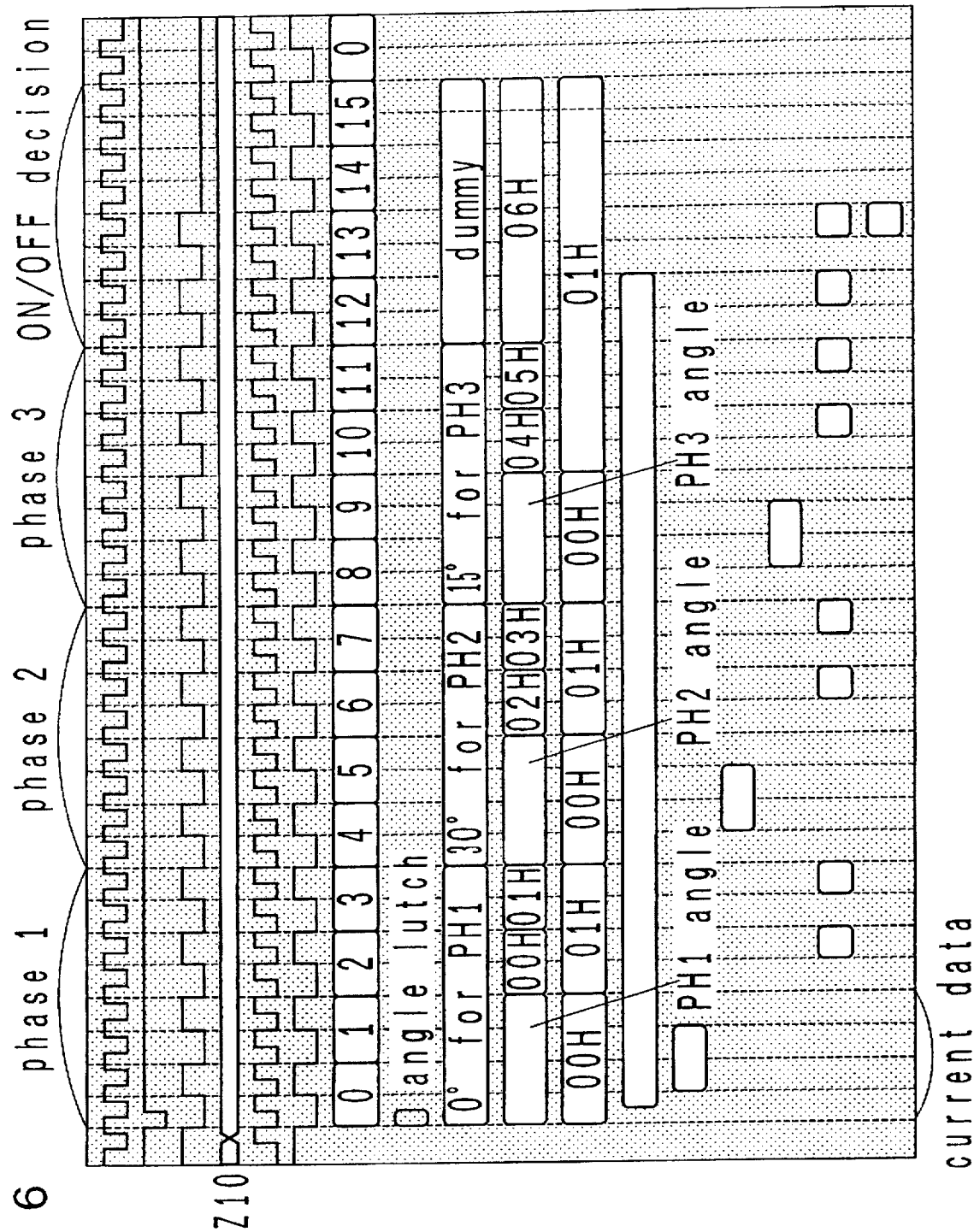
FIG. 6 is a series of timing charts of control signals and control data delivered from the circuit 15 shown in FIG. 1b, principally indicating a change therein.

Referring to FIG. 4 which shows the construction of the current waveform generating circuit 15 and FIG. 6 which indicates the timing of various signals occurring therein, an energization pattern produced by CPU 11 is written into the bidirectional RAM (read-write memory) 49 within the circuit 15. In this embodiment, the bidirectional RAM 49 includes a pair of memory banks, and waveform data is read from one of the memory banks while data from CPU 11 is entered into the other bank. In this manner, a read-out of waveform data and writing of data from CPU 11 can take place substantially simultaneously.

The memory bank 1 in the bidirectional RAM 49 is allocated to memory addresses D800H to D886H (H representing a hexadecimal notation), while the memory bank 2 is allocated to memory addresses from DC00H to DC86H The following data is written into the memory bank 1.

D800H to D87FH (128 bytes):
a current value every 0.35° increment of the angle of rotation (45°:128 steps)

D880H: angle 1 of phase 1 (angle of commencement or termination of energization)

D881H: angle 2 of phase 1 (angle of termination or commencement of energization)

D882H: angle 1 of phase 2 (angle of commencement or termination of energization)

D883H: angle 2 of phase 2 (angle of termination or commencement of energization)

D884H: angle 1 of phase 3 (angle of commencement or termination of energization)

D885H: angle 2 of phase 3 (angle of termination or commencement of energization)

D886H: waveform border (a border representing the commencement of energization at angle 1 termination of energization at angle 2, the termination of energization at angle 1 commencement of energization at angle 2).

The allocation of memory in the memory bank 2 remains the same as in the memory bank 1 except that the address is displaced by 400H. A switching between the memory banks 1 and 2 takes place by controlling a bit 10 (A10) of the address of the bidirectional RAM 49.

Figure 4A:
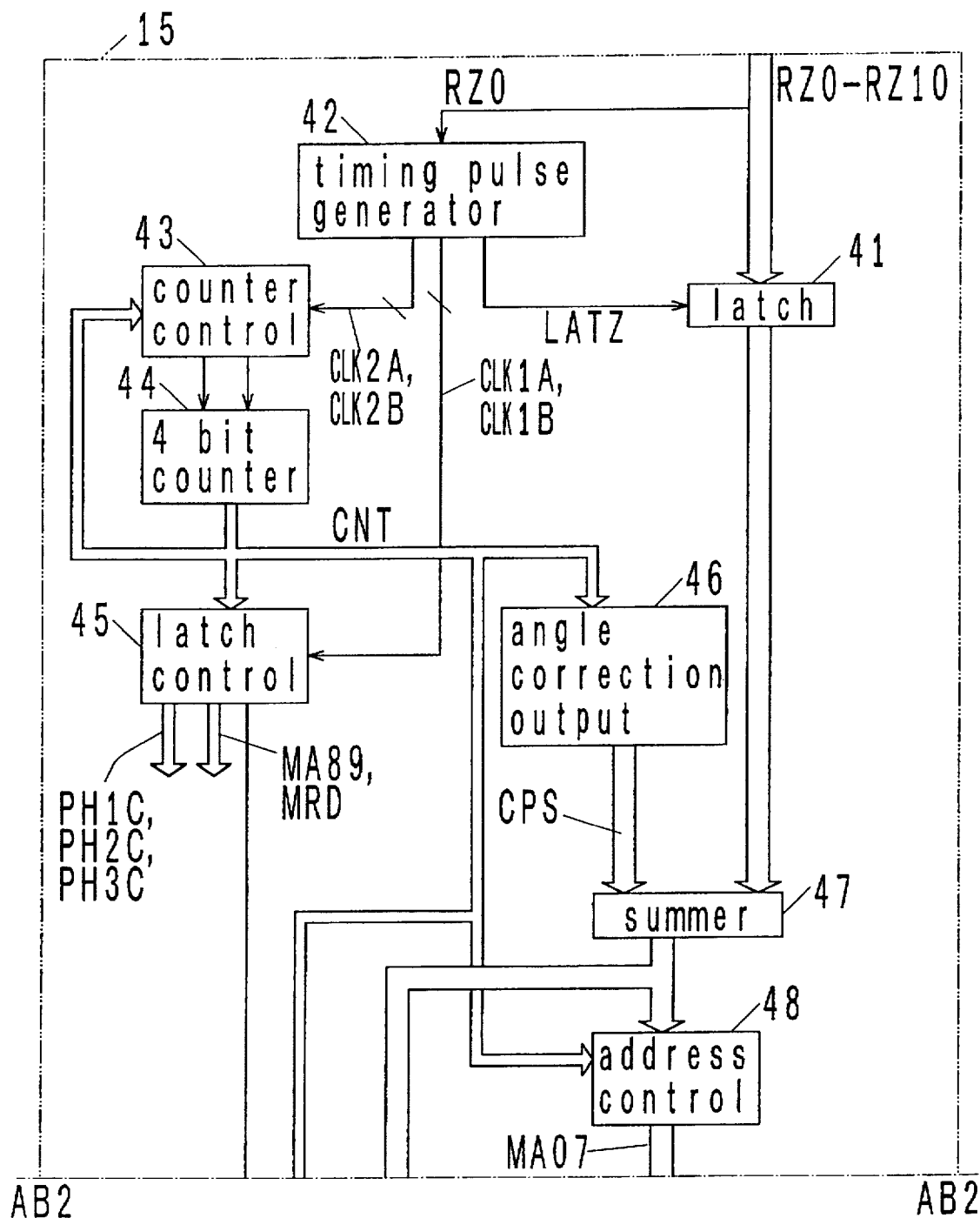
FIG. 4a is a block diagram of substantially upper half of a current waveform generating circuit 15 shown in FIG. 1b.
Figure 4B:
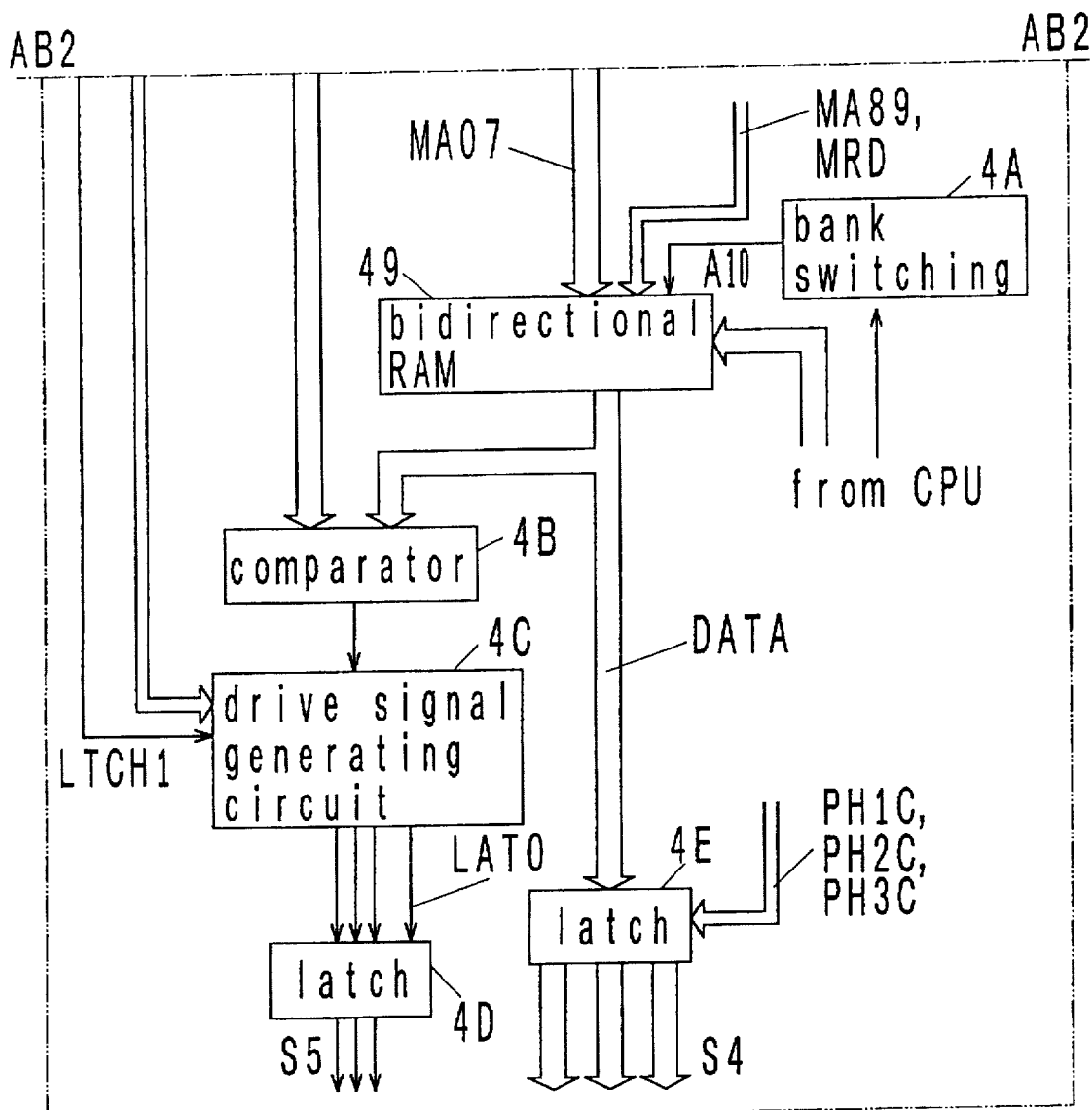
FIG. 4b is a block diagram of substantially lower half of the current waveform generating circuit 15 shown in FIG. 1b, FIGS. 4a and 4b being joined together along a line AB2—AB2 to represent the entire circuit 15 in one block diagram.

With continued reference to FIGS. 4a, 4b and 6, detected angle data RZ0 to RZ10, including 11 bits, which are delivered from the angle sensor 1d, is latched in a latch 41, and thence fed to a summer 47. The least significant bit signal RZ0 in the angle data is applied to a timing pulse generator circuit 42, which produces clock pulses CLK1A, CLK1B, CLK2A, CLK2B and latch control signal LATZ, based on an 8 MHz clock pulse CLK8N, internally generated therein and the bit signal RZ0. A 4 bit counter 44 counts the clock pulse CLK2B delivered from the timing pulse generator circuit 42, and repeatedly delivers a figure in a range from 0 to 15 sequentially as a count CNT. The operation of various circuits within the circuit 15 is determined in accordance with the count CNT from the counter 44. The count CNT is fed to a latch control circuit 45, an angle correction output circuit 46, an address control circuit 48 and a drive signal generating circuit 4C.

The angle correction output circuit 46 is an encoder, which delivers a correction value CPS, as indicated below, in accordance with the count CNT fed:

| CNT: | 0 to 3 | CPS: | 0 (0°) |
|---|---|---|---|
| CNT: | 4 to 7 | CPS: | 84 (30°) |
| CNT: | 8 to 11 | CPS: | 42 (15°) |
| CNT: | 12 to 15 | CPS: | 42 (15°; dummy) |

Accordingly, when the count CNT is from 0 to 3, a rotational position of the rotor (angle: RZ0-RZ10) directly appears at the output of a summer 47. However, when the count CNT is from 4° to 7°, 30° is summed (or the rotational position is shifted) and when the count CNT is from 8° to 11°, 15° is summed. The output of the summer 47 is not utilized when the count CNT is from 12 to 15.

The address control circuit 48 delivers 8 bit data MA07 as follows, in accordance with the count CNT fed:

| CNT: | 0, 1, 4, 5, 8, 9 | MA07: | output from summer 47 |
|---|---|---|---|
| CNT: | 2 | MA07: | 0 |
| CNT: | 3 | MA07: | 1 |
| CNT: | 6 | MA07: | 2 |
| CNT: | 7 | MA07: | 3 |
| CNT: | 10 | MA07: | 4 |
| CNT: | 11 | MA07: | 5 |
| CNT: | 12 to 15 | MA07: | 6 |

The latch control circuit 45 delivers 2 bit data MA89, as follows, in accordance with the count CNT fed. It is to be noted that a memory read-out signal MRD is effective when the count CNT is from 0 to 12:

| CNT: | 0, 1, 4, 5, 8, 9 | MA89: | 00H |
|---|---|---|---|
| CNT: | 2, 3, 6, 7, 10 to 15 | MA89: | 01H |

8 bit data MA07 delivered from the address control circuit 48 is applied to the least 8 bits in the address of the bidirectional RAM. 2 bit data MA89 delivered from the latch control circuit 45 is applied to the eighth and the ninth bit in the address of the bidirectional RAU Accordingly, the address specified by the least 10 bits of the bidirectional RAM 49 depends on the count CNT as follows:

| CNT: | 0, 1, 4, 5, 8, 9 | MA07: | output from summer 47 |
|---|---|---|---|
| CNT: | 2 | MA07: | 0100H |
| CNT: | 3 | MA07: | 0101H |
| CNT: | 6 | MA07: | 0102H |
| CNT: | 7 | MA07: | 0103H |
| CNT: | 10 | MA07: | 0105H |
| CNT: | 11 | MA07: | 0105H |
| CNT: | 12 to 15 | MA07: | 0106H |

Thus, information as indicated below is read from the bidirectional RAM 49 depending on the count CNT which is fed:

| CNT: | 0, 1 | DATA: | current value (phase 1) for present angle of rotation |
|---|---|---|---|
| CNT: | 2 | DATA: | angle 1 of phase 1 |
| CNT: | 3 | DATA: | angle 2 of phase 1 |
| CNT: | 4, 5 | DATA: | present angle of rotation + current value for 30° (current value for phase 2) |
| CNT: | 6 | DATA: | angle 1 of phase 2 |
| CNT: | 7 | DATA: | angle 2 of phase 2 |
| CNT: | 8, 9 | DATA: | present current value + current value for 15° (current value for phase 3) |
| CNT: | 10 | DATA: | angle 1 of phase 3 |
| CNT: | 11 | DATA: | angle 2 of phase 3 |
| CNT: | 12 to 15 | DATA: | waveform border |

Current value for phase 1 (DATA: 8 bits) delivered from the bidirectional RAM 49 when the count CNT is either 0 or 1 is latched into a latch 4E in synchronism with a signal PH1C delivered from the latch control circuit 45. Similarly, a current value for phase 2 delivered from the bidirectional RAM 49 when the count CNT is either 4 or 5 is latched into the latch 4E in synchronism with a latch control signal PH2C. A current value for phase 3 delivered from the bidirectional RAM 49 when the count CNT is either 8 or 9 is latched into the latch 4E in synchronism with a latch control signal PH3C. A triple set (for three phases) of signals S4 delivered from the latch 4E is applied to the summer 16 shown in FIG. 2.

On the other hand, a comparator 4B compares an output from the summer 47 against an output from the bidirectional RAM 49. What is actually utilized here is angle 1 for phase 1, angle 2 for phase 1, angle 1 for phase 2, angle 2 for phase 2, angle 1 for phase 3, angle 2 for phase 3 and borders of the waveform among the outputs from the bidirectional RAM 49. In other words, the comparator 4B distinguishes the relative magnitude between the current angle (plus shift of the rotor) and the angle 1 or 2 of each phase.

An output from the comparator 4B is latched into and utilized within a drive signal generating circuit 4C by a control signal LTCH1 delivered from the latch control circuit 45 when the count CNT is either one of 2, 3, 6, 7, 10, 11, 12 and 13. Specifically, an output from the comparator 4B when the count CNT is 2 or 3 is used to generate a binary signal which indicates a switching between the on/off of the energization of the phase 1. An output from the comparator 4B when the count CNT is 6 or 7 is used to produce a binary signal indicating a switching between the on/off of the energization of the phase 2. An output from the comparator 4B when the count CNT is 10 or 11 is used to produce a binary signal indicating a switching between the on/off of the energization of the phase 3. An output from the comparator 4B when the count CNT is 12 or 13 is used to produce a binary signal (S5) indicating the on/off of the energization by distinguishing the borders of the waveforms.

8 bit data delivered from the summer 47 represents a figure in a range from 0 to 127, and the most significant bit is always 0. Angle 1 of phase 1, angle 2 of phase 1, angle 1 of phase 2, angle 2 of phase 2, angle 1 of phase 3 and angle 2 of phase 3 which are stored in the bidirectional RAM 49 are also figures in the range from 0 to 127, and the most significant bit is always 0. On the other hand, as to the borders of waveform stored in the bidirectional RAM 49, 255 is allocated to a concave waveform while 0 is allocated to a convex waveform Accordingly, when the comparator 4B compares the borders of the waveform against the output from the summer 47, the output of the comparator 4B is determined only in accordance with the borders of the waveform independently from the output from the summer 47. Thus, the drive signal generating circuit 4C determines if the waveforms in the binary signals for three phases delivered are either concave or convex, in accordance with "border of waveform" information when the count CNT is 12 or 13.

Specifically, when the border of the waveform is equal to 0, a binary signal (S5) is produced which is OFF as long as (current angle)≦(angle 1 of phase 1)

ON as long as (angle 1 of phase 1)<(current angle)<(angle 2 of phase 1), and

OFF as long as (angle 2 of phase 1)<(current angle).

When the border of the waveform is equal to 255, a binary signal (S5) is produced which is ON as long as (current angle)≦(angle 1 of phase 1)

OFF as long as (angle 1 of phase 1)<(current angle)< (angle 2 of phase 1), and

ON as long as (angle 2 of phase 1)<(current angle).

The same applies to the binary signals (S5) for the phase 2 and phase 3.

Binary signals (S5) for phases 1, 2 and 3 which are produced by the drive signal generating circuit 4C are latched in a latch 4D. The triple set of binary signals delivered from the drive signal generating circuit 4C is latched in the latch 4D in response to a control signal LAT0 which appears in synchronism with the latch control signal LTCH1 which is delivered from the latch control circuit 45 at a timing (CNT: 13) when the status of all the binary signals are established, and is subsequently applied to the output decision circuit 17 as a triple set (for three phases) of binary signals (S5).

While a preferred embodiment of the invention has been shown and described above, a number of changes and modifications are possible therein. For an example, the embodiment as described comprises the current map memory 13a which contains a multiplicity of data items, each of which contains a standard energization ON angle (start timing), an energization OFF angle, a current limit and a waveform pattern. For simplifying a process of CPU 11, the energization OFF angle is preliminary determined and stored in the memory 13a by calculating an advance value as shown in FIG. 19 corresponding to a rotational speed and a target torque. However, an calculator or a microcomputer which process a calculation in a high speed may be employed for the calculation of the energization OFF angle, in which case the calculator or the microcomputer, when either one of the rotational speed and the target torque alters, calculates the advance value and then calculates the energization OFF angle to be delivered to the current waveform generating circuit 15.

Also, the energization ON angle may be adjusted as required. However, according to experiments, the adjustment of the energization ON angle is not effective for preventing the generation of noises. The adjustment of the energization OFF angle as described is effective for preventing the generation of noises.

Accordingly, it is not intended that the invention be limited to the specific construction or arrangement disclosed herein, but that the right is reserved to all changes and modifications coming within the scope of invention defined by the appended claims.

What is claimed is:

1. An energization control system for an electric motor comprising:

means for detecting an angle of rotation of a rotor of the motor;

a controller for generating a target current which includes means for determining an energization OFF angle, said energization OFF angle being advanced from a standard energization OFF angle in proportion to the rotational speed when the rotational speed is under or equal to a predetermined value, said predetermined value being equal to or near to an upper threshold value of a speed range at which a high level of acoustic noises is generated with the standard energization OFF angle; and a motor driver for supplying a current responding to the target current for energizing the motor during a time interval from an energization ON angle to the energization OFF angle.

2. An energization control system for an electric motor according to claim 1 wherein said means for determining an energization OFF angle advances the energization OFF angle in inverse proportion to the rotational speed when the rotational speed is over the predetermined value.

3. An energization control system for an electric motor according to claim 2 in which the controller generates a target torque and said means for determining an energization OFF angle reduces the advance of the energization OFF angle in proportion to an increment of the target torque.

4. An energization control system for an electric motor according to claim 3 in which said controller increases the target current in proportion to a decline of the rotational speed.

5. An energization control system for an electric motor according to claim 3 in which the controller including:

a current map memory storing target current values corresponding to rotational speeds and target torque values of the rotor and the energization OFF angles which are advanced from the standard energization OFF angle corresponding to rotational speeds and target torque values of the rotor; and means for reading a target current value and an energization OFF angle which correspond to the detected rotational speed and specified target torque from the current map memory.

6. An energization control system for an electric motor according to claim 3 in which the controller includes:

a waveform map memory for storing a group of data which defines the configuration of an energization pattern for each pattern number and for each angle of rotation of the rotor;

a current map memory storing target current values corresponding to rotational speeds and target torque values of the rotor, the standard OFF angle, the energization OFF angles which are advanced from the standard energization OFF angle corresponding to rotational speeds and target torque values of the rotor and pattern numbers corresponding to rotational speeds and target torque values of the rotor; and means for reading a target current value, an energization OFF angle and a pattern number which correspond to the detected rotational speed and specified target torque from the current map memory, reading a group of data corresponding to the pattern number read out from the waveform map memory, and forming an energization pattern on the basis of the group of data read out from the waveform map memory and the target current value, the standard energization ON angle, and the energization OFF angle read out from the current map memory.

7. An energization control system for an electric motor according to claim 2 wherein the controller generates a target acceleration, calculates an actual acceleration of the detected rotational speed and calculates an acceleration compensation on the basis of a deviation of the actual acceleration from the target acceleration, and the motor driver energizes the motor by supplying a current responding to the acceleration compensation for adjusting the actual acceleration to the target acceleration.

8. An energization control system for an electric motor according to claim 7 in which the controller calculates an acceleration compensation on the basis of a deviation of the actual acceleration from the target acceleration when the detected rotational speed being in a low speed range, while cancelling the acceleration compensation without the calculation when the detected rotational speed being in a high speed range.

* * * * *